US012520758B2

(12) United States Patent
Clark et al.

(10) Patent No.: US 12,520,758 B2
(45) Date of Patent: Jan. 13, 2026

(54) CONTROLLING AN AGRICULTURAL HARVESTER BASED UPON MATERIAL OTHER THAN GRAIN (MOG) CONTENT CHARACTERISTICS

(71) Applicant: Deere & Company, Moline, IL (US)

(72) Inventors: Scott N. Clark, Bettendorf, IA (US);
Duane M. Bomleny, Geneseo, IL (US);
Justin C. Freehill, Fenton, IL (US);
Scott E. Faulkner, Orion, IL (US);
Nathan R. Vandike, Geneseo, IL (US);
Nathan E. Krehbiel, Bettendorf, IA (US)

(73) Assignee: Deere & Company, Moline, IL (US)

( * ) Notice: Subject to any disclaimer, the term of this patent is extended or adjusted under 35 U.S.C. 154(b) by 120 days.

(21) Appl. No.: 18/672,543

(22) Filed: May 23, 2024

(65) Prior Publication Data

US 2025/0359511 A1 Nov. 27, 2025

(51) Int. Cl.
| | | |
|---|---|---|
| *G06V 20/56* | (2022.01) | |
| *A01D 41/12* | (2006.01) | |
| *A01D 41/127* | (2006.01) | |
| *G06V 10/56* | (2022.01) | |
| *G06V 20/10* | (2022.01) | |

(52) U.S. Cl.
CPC .......... *A01D 41/127* (2013.01); *A01D 41/12* (2013.01); *A01D 41/1274* (2013.01); *G06V 10/56* (2022.01); *G06V 20/188* (2022.01); *G06V 20/56* (2022.01)

(58) Field of Classification Search
CPC .. A01D 41/127; A01D 41/12; A01D 41/1274; G06V 10/56; G06V 20/188; G06V 20/56
See application file for complete search history.

(56) References Cited

U.S. PATENT DOCUMENTS

| | | | |
|---|---|---|---|
| 7,721,515 | B2 | 5/2010 | Pollklas et al. |
| 9,050,890 | B2 | 6/2015 | Buerkle et al. |
| 9,740,208 | B2 | 8/2017 | Sugumaran |
| 9,807,933 | B2 | 11/2017 | Boyd et al. |
| 9,829,883 | B1 | 11/2017 | Lavoie et al. |
| 10,049,296 | B2 | 8/2018 | Walker |
| 10,255,670 | B1 | 4/2019 | Wu et al. |
| 10,377,197 | B2 | 8/2019 | Fukatsu et al. |
| 10,721,859 | B2 | 7/2020 | Wu et al. |
| 10,754,353 | B2 | 8/2020 | Sporrer et al. |
| 10,761,544 | B2 | 9/2020 | Anderson et al. |
| 11,112,262 | B2 | 9/2021 | Anderson |
| 11,308,735 | B2 | 4/2022 | Wagner et al. |
| 11,324,164 | B2 | 5/2022 | Sorensen |
| 11,470,776 | B2 | 10/2022 | Barther et al. |
| 11,483,972 | B2 | 11/2022 | Dima et al. |

(Continued)

FOREIGN PATENT DOCUMENTS

| | | |
|---|---|---|
| CN | 113287422 A | 8/2021 |
| DE | 102015224175 B3 | 4/2017 |

(Continued)

*Primary Examiner* — Mathew Franklin Gordon
(74) *Attorney, Agent, or Firm* — Kelly, Holt & Christenson; Joseph R. Kelly

(57) ABSTRACT

A content characteristic of material other than grain (MOG), such as MOG color or a leaf-to-stalk ratio in the MOG, are detected. A controllable subsystem on an agricultural harvester is controlled based upon the content characteristic of the MOG.

20 Claims, 13 Drawing Sheets

(56) References Cited

U.S. PATENT DOCUMENTS

| | | |
|---|---|---|
| 11,499,295 B2 | 11/2022 | Anderson |
| 11,758,844 B2 | 9/2023 | White et al. |
| 11,805,734 B2 | 11/2023 | Li et al. |
| 2006/0020402 A1 | 1/2006 | Bischoff et al. |
| 2019/0227554 A1 | 7/2019 | Cantrell et al. |
| 2020/0264154 A1 | 8/2020 | Saez et al. |
| 2021/0357664 A1 | 11/2021 | Kocer et al. |
| 2022/0232770 A1 | 7/2022 | Yanke et al. |
| 2022/0348322 A1 | 11/2022 | Zemenchik |
| 2023/0000015 A1 | 1/2023 | Herrmann et al. |
| 2023/0345873 A1 | 11/2023 | Goossens et al. |

FOREIGN PATENT DOCUMENTS

| | | |
|---|---|---|
| DE | 102016202628 A1 | 8/2017 |
| EP | 2545761 B1 | 12/2016 |
| EP | 3401854 A1 | 11/2018 |
| EP | 3284334 B1 | 4/2019 |
| EP | 3552474 B1 | 8/2021 |
| JP | 2021058099 A | 4/2021 |
| WO | 2023021005 A1 | 2/2023 |
| WO | 2023047240 A1 | 3/2023 |
| WO | 2023187494 A1 | 10/2023 |

CONTROLLING AN AGRICULTURAL HARVESTER BASED UPON MATERIAL OTHER THAN GRAIN (MOG) CONTENT CHARACTERISTICS

FIELD OF THE DESCRIPTION

The present description relates to mobile agricultural machines. More specifically, the present description relates to controlling an agricultural machine based upon content characteristics of material other than grain (MOG).

BACKGROUND

There are many different types of mobile agricultural machines. One such mobile agricultural machine is an agricultural harvester. The agricultural harvester can include a header (such as a corn header, a draper or auger-type header). The corn header includes a plurality of row units, each row unit including crop processing functionality that gathers the corn towards the header, severs the stalk, and captures the ears of corn. The ears of corn are then conveyed further back into the agricultural harvester for further processing.

Other headers have a cutter that severs crop and a conveyor belt or draper belt that gathers crop toward the center of the header. Another conveyor moves the crop from the header into a feeder house toward a feed accelerator which accelerates the crop material toward a thresher. The header can also work in conjunction with a reel which engages the crop as the crop is cut.

The discussion above is merely provided for general background information and is not intended to be used as an aid in determining the scope of the claimed subject matter.

SUMMARY

A content characteristic of material other than grain (MOG), such as MOG color or a leaf-to-stalk ratio in the MOG, are detected. A controllable subsystem on an agricultural harvester is controlled based upon the content characteristic of the MOG.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
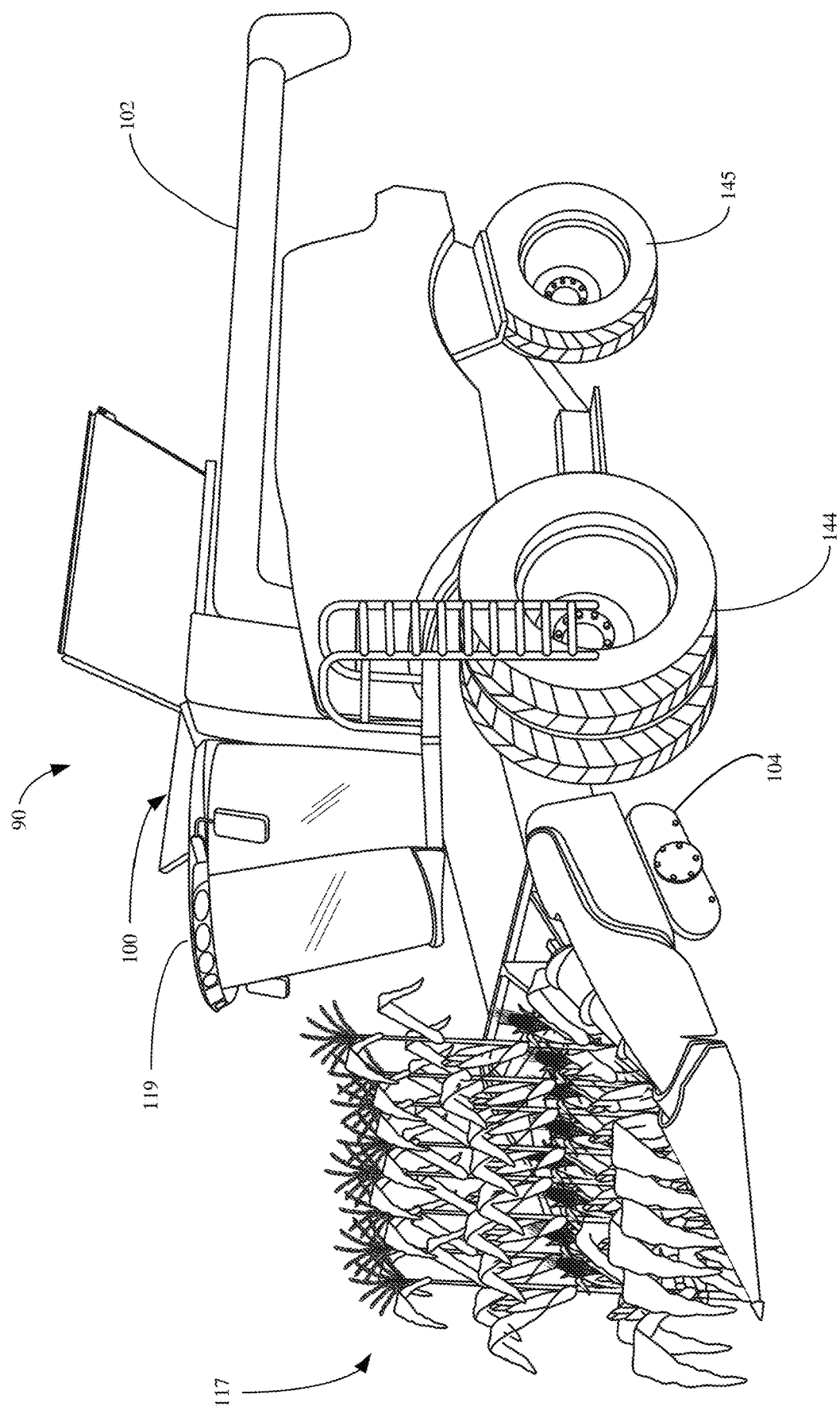
FIG. 1 illustrates one example of a mobile agricultural harvesting machine (also referred to as an agricultural harvester).

For the purposes of promoting an understanding of the principles of the present disclosure, reference will now be made to the examples illustrated in the drawings, and specific language will be used to describe the same. It will nevertheless be understood that no limitation of the scope of the disclosure is intended. Any alterations and further modifications to the described devices, systems, methods, and any further application of the principles of the present disclosure are fully contemplated as would normally occur to one skilled in the art to which the disclosure relates. In particular, it is fully contemplated that the features, components, and/or steps described with respect to one example may be combined with the features, components, and/or steps described with respect to other examples of the present disclosure.

A mobile agricultural harvesting machine, such as combine harvester, can include a self-propelled portion and a header portion or header, such as a corn header, or another header, coupled to the self-propelled portion. A corn header includes a plurality of row units spaced apart along the width of the corn header. Each row unit can include, among other things, a set of deck plates, a set of crop gathering components, such as a set of gathering chains, as well a set of rollers (sometimes called stalk rollers). A row unit acts to gather corn plants towards the header, to sever the stalks, and to separate the corn ears from the corn plants. The gathering components gather the corn plant towards the header. The rollers, placed below the deck plates, pull the stalk down. The deck plates are controllably spaced apart, usually in a tapered fashion (narrower towards the front of the header and progressively wider moving rearward) and define a gap that should be wide enough to receive the crop stalk and allow material other than grain (MOG) through but narrow enough to prevent the corn ear (or a portion of the corn ear) from slipping through the gap.

If the deck plates are not spaced apart enough, the crop may not be harvested, the gathering components and rollers may be overburdened due to the resistance caused by the deck plates, or too much MOG may be taken in. Excess MOG can burden processing components of the self-propelled portion, resulting in less clean grain, grain loss, as well as other detrimental effects. On the other hand, if the deck plates are spaced too far apart, the corn ears may slip between the deck plates and contact the rollers which can result in grain loss at the header (sometimes referred to as butt shelling).

Additionally, the header speed (also referred to as back shaft speed), or the speed of components of the header (such as the speed of the gathering chains or the speed of the stalk rollers, or both) can have an impact on the amount of MOG intake. For example, where header speed is too high, stalks may prematurely snap which may lead to grain loss at the header as well as additional intake of MOG. However, if header speed is set too low, crop may not be successfully captured by the header and thus result in grain loss at the header.

Other types of headers may be impacted by MOG characteristics as well. For example, when harvesting soybeans, wheat, canola, barley, and other such crops, the header may have an auger or draper or other conveyor that moves the crop toward the feeder house, and such headers often operate in conjunction with a reel. MOG intake and MOG moisture and other MOG characteristics can impact the operation of such headers.

Additionally, the header position (e.g., header height, header tilt, header roll, etc.) can have an impact on the amount of MOG intake. For example, as the height at which the header engages the crop increases, less MOG will be processed and therefore less MOG will be potentially taken in by the harvester. In another example, adjusting the fore-to-aft tilt of the header can also have an impact on MOG intake. For instance, tilting a corn header further aft allows the row units to process more of the stalk which may result in less MOG intake. Tilting a belt-type header further aft may raise the cut height, also reducing MOG intake.

In addition, the characteristics of the MOG that is taken into the agricultural harvester can affect the harvesting operation as well. For instance, leaf color is an indicator of certain characteristics of vegetative material which impact processing of the crop. As one example, leaf color is indicative of moisture content which impacts threshing and cleaning system performance of the machine. Thus, where the MOG is green, indicating that it has a higher moisture content, this may increase the load on the crop processing systems in the agricultural harvester over instances where the MOG is less green, indicating a drier material. Further, the MOG can include both crop leaves and crop stalk. The leaf-to-stalk ratio of the MOG can also impact the machine operation.

As an example of how MOG color may affect crop processing, when the crop being harvested is green corn, this means that the kernels are more securely attached to the ears than when the corn is drier (and thus less green). When the crop is brown, the kernels are less securely attached to the ears. Therefore, if the deck plates are set wider, this can increase crop loss. Therefore, the deck plates can be run with a greater separation distance when the crop is green than when the crop is brown. Further, if the deck plates are set too tightly with brown crop this results in more unwanted material (e.g., MOG) being collected, which can overload the cleaning shoe, resulting in lower productivity and higher grain loss.

The present description thus describes a system in which one or more sensors sense the content characteristics of the MOG. The content characteristics can include one or both of the color of the MOG and the leaf-to-stalk ratio in the MOG. Therefore, the sensor may include an optical sensor which senses an image of the crop ahead of the header in the direction of travel, and/or that senses an image of the harvested material either in the processing stream on the header or in the agricultural harvester, or that senses the MOG in the residue that is handled by a residue handling system in the agricultural harvester. Once the content characteristics of the MOG are identified (the MOG color and/or the leaf-to-stalk ratio in the MOG), a control signal is generated to control a controllable subsystem on the agricultural harvester (e.g., the self-propelled portion of the agricultural harvester and/or the header of the agricultural harvester). For instance, the deck plates can be controlled based upon the content characteristics of the MOG. The back shaft speed or other header actuator that controls header components can be controlled based upon the content characteristics of the MOG. The draper belt speed or cross-auger speed can be controlled based on the content characteristics of the MOG. The orientation of the header and/or the reel can be controlled based on the content characteristics of the MOG. Also, any of a variety of other settings or controllable subsystems (such as threshing settings, cleaning settings, position or orientation settings, or other settings) can be controlled based upon the content characteristics of the MOG.

FIG. 1 is a perspective view that illustrates an agricultural system 90 with a mobile agricultural harvesting machine (or harvester) 100. Harvester 100 includes a self-propelled portion 102 and a header portion (or header) 104, coupled to the self-propelled portion 102. Header 104 is illustratively a corn header and engages and processes corn plants 117 at a field as the harvester 100 travels over the field. Header 104 will be shown in more detail below.

Self-propelled portion 102 further includes a set of ground engaging traction elements, such as front wheels 144 and rear wheels 145. In other examples, one or both of the front wheels 144 and rear wheels 145 can comprise other types of ground engaging traction elements, such as tracks. In some examples, the pair of front wheels 144 or rear wheels 145 are used to steer while the other pair is driven by a propulsion subsystem to propel the self-propelled portion 102 across a field in which the harvester 100 operates. In the example illustrated, harvester 100 includes an operator compartment or cab 119, which can include a variety of different operator interface mechanisms for receiving inputs to control harvester 100 as well as for displaying or otherwise outputting various information.

Figure 2:
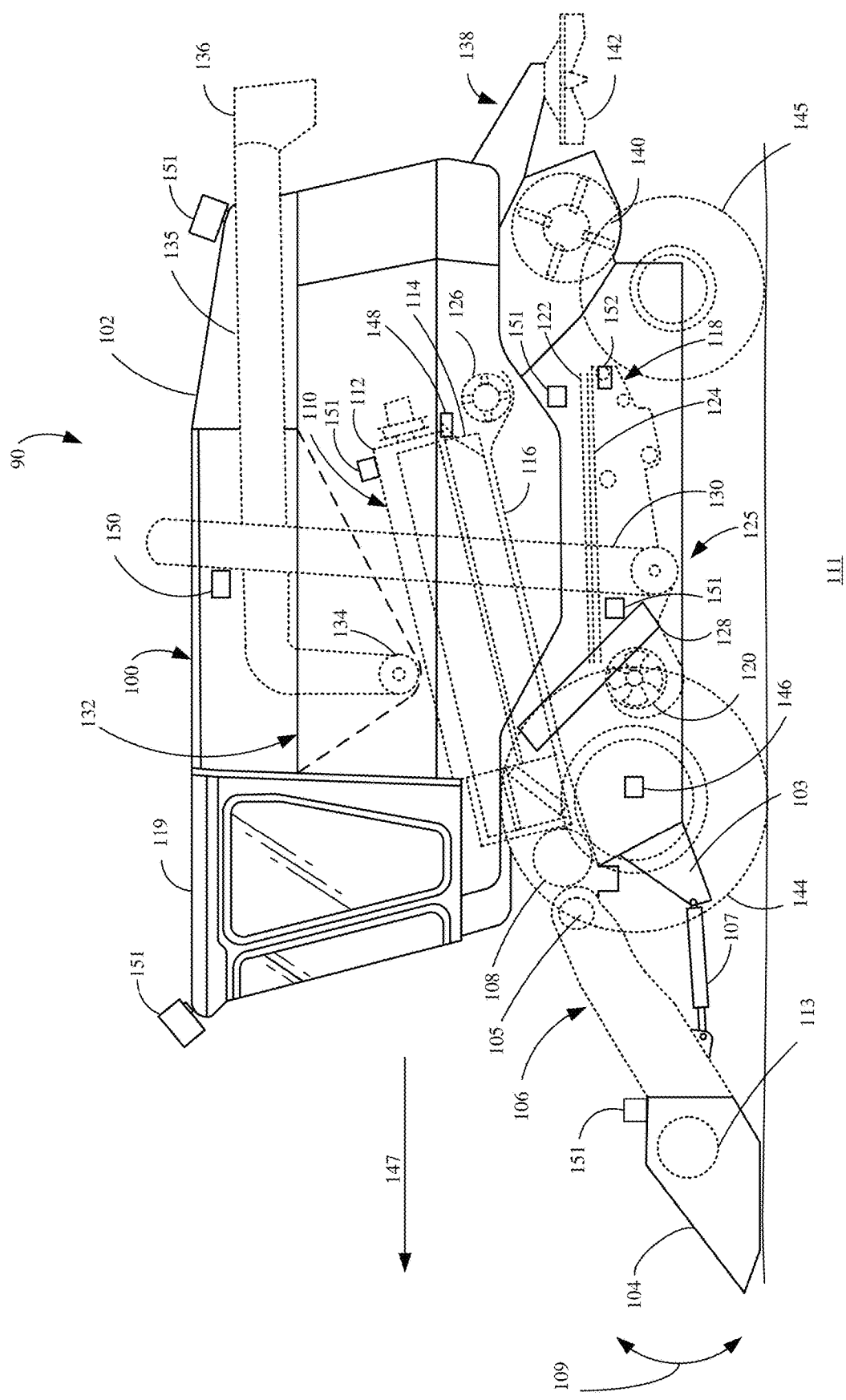
FIG. 2 is a partial pictorial, partial schematic illustration of one example of an agricultural harvester.

FIG. 2 is a partial pictorial, partial schematic, illustration of agricultural harvester 100 showing some items on harvester 100 in more detail. As shown in FIG. 1, harvester 100 in FIG. 2 includes a self-propelled portion 102 and header portion (or header) 104, coupled to the self-propelled portion 102. Harvester 100 includes a feeder house 106, a feed accelerator 108, and a thresher generally indicated at 110. The feeder house 106 and the feed accelerator 108 form part of a material handling subsystem 125. Header 104 is pivotally coupled to a frame 103 of self-propelled portion 102 about pivot axis 105. One or more actuators 107 drive movement of header 104 about axis 105 in the direction generally indicated by arrow 109. Thus, a vertical position of header 104 (the header height) above ground 111 over which the header 104 travels is controllable by actuating actuator 107. While not shown in FIG. 1, agricultural harvester 100 may also include one or more actuators that operate to apply a tilt angle, a roll angle, or both to the header 104 or portions of header 104.

Thresher 110 illustratively includes a threshing rotor 112 and a set of concaves 114. Further, agricultural harvester 100 also includes a separator 116. Agricultural harvester 100 also includes a cleaning subsystem or cleaning shoe (collectively referred to as cleaning subsystem 118) that includes a cleaning fan 120, chaffer 122, and sieve 124. The material handling subsystem 125 also includes discharge beater 126, tailings elevator 128, and clean grain elevator 130. The clean grain elevator moves clean grain into clean grain tank 132.

Harvester 100 also includes a material transfer subsystem that includes a conveying mechanism 134, a chute 135, and a spout 136. Conveying mechanism 134 can be a variety of different types of conveying mechanisms, such as an auger or blower. Conveying mechanism 134 is in communication with clean grain tank 132 and is driven (e.g., hydraulicly or electrically) to convey material from grain tank 132 through chute 135 and spout 136. Chute 135 is rotatable through a range of positions (shown in the storage position in FIG. 2) away from agricultural harvester 100 to align spout 136 relative to a material receptacle (e.g., grain cart, towed trailer, etc.) that is configured to receive the material. Spout 136, in some examples, is also rotatable to adjust the direction of the crop stream exiting spout 136.

Harvester 100 also includes a residue subsystem 138 that can include chopper 140 and spreader 142. Harvester 100 also includes a propulsion subsystem that includes an engine that drives ground engaging traction components, such as wheels 144 or wheels 144 and 145 to propel the harvester 100 across a worksite such as a field (e.g., ground 111). In some examples, a harvester within the scope of the present disclosure may have more than one of any of the subsystems mentioned above. In some examples, harvester 100 may have left and right cleaning subsystems, separators, etc., which are not shown in FIG. 2.

In operation, and by way of overview, harvester 100 illustratively moves through a field in the direction indicated by arrow 147. As harvester 100 moves, header 104 (and the associated row units) engage the corn plants to be harvested and separates the corn ears from the corn plants. The gathering chains (shown below) and cross auger 113 can be driven (e.g., through a transmission or directly) by a back shaft which, itself, is driven by an actuator powered by self-propelled harvester 102. The actuator may be a power takeoff, a hydraulic or electric actuator, or another actuator.

The separated crop material is engaged by a cross auger 113 which conveys the separated crop material to a center of the header 104 where the severed crop material is then moved through a conveyor in feeder house 106 toward feed accelerator 108, which accelerates the separated crop material into thresher 110. The separated crop material is threshed by rotor 112 rotating the crop against concaves 114. The threshed crop material is moved by a separator rotor in separator 116 where a portion of the residue is moved by discharge beater 126 toward the residue subsystem 138. The portion of residue transferred to the residue subsystem 138 is chopped by residue chopper 140 and spread on the field by spreader 142. In other configurations, the residue is released from the agricultural harvester 100 in a windrow.

Grain falls to cleaning subsystem 118. Chaffer 122 separates some larger pieces of material from the grain, and sieve 124 separates some of finer pieces of material from the clean grain. Clean grain falls to an auger that moves the grain to an inlet end of clean grain elevator 130, and the clean grain elevator 130 moves the clean grain upwards, depositing the clean grain in clean grain tank 132. Residue is removed from the cleaning subsystem 118 by airflow generated by cleaning fan 120. Cleaning fan 120 directs air along an airflow path upwardly through the sieves and chaffers. The airflow carries residue rearwardly in harvester 100 toward the residue handling subsystem 138.

Tailings elevator 128 returns tailings to thresher 110 where the tailings are re-threshed. Alternatively, the tailings also may be passed to a separate re-threshing mechanism by a tailings elevator or another transport device where the tailings are re-threshed as well.

Harvester 100 can include a variety of sensors, some of which are illustrated in FIG. 2, such as ground speed sensor 146, one or more separator loss sensors 148, a clean grain camera 150, one or more loss sensors 152 provided in the cleaning subsystem 118, one or more observation sensor systems 151, which may include, one or more of one or more imaging systems (e.g., mono or stereo cameras), optical sensors, lidar, radar, ultrasonic sensors, thermal or infrared sensors, as well as various other sensors, such as sensors that emit and/or received electromagnetic radiation. FIG. 2 shows that sensors 151 can be mounted to capture images ahead of harvester 102, to the rear of harvester 102, on header 104 to capture images of material on header 104, or elsewhere to capture images of material as the material is processed by and flows through harvester 102.

Ground speed sensor 146 senses the travel speed of harvester 100 over the ground. Ground speed sensor 146 may sense the travel speed of the harvester 100 by sensing the speed of rotation of the ground engaging traction components (such as wheels or tracks), a drive shaft, an axle, or other components. In some instances, the travel speed may be sensed using a positioning system, such as a global positioning system (GPS), a dead reckoning system, a Doppler speed sensor, or a wide variety of other systems or sensors that provide an indication of travel speed. Ground speed sensors 146 can also include direction sensors such as a compass, a magnetometer, a gravimetric sensor, a gyroscope, GPS derivation, to determine the direction of travel in two or three dimensions in combination with the speed. This way, when harvester 100 is on a slope, the orientation of harvester 100 relative to the slope is known. For example, an orientation of harvester 100 could include ascending, descending or transversely travelling the slope.

Loss sensors 152 illustratively provide an output signal indicative of the quantity of grain loss occurring in both the right and left sides of the cleaning subsystem 118. In some examples, sensors 152 are strike sensors which count grain strikes per unit of time or per unit of distance traveled to provide an indication of the grain loss occurring at the cleaning subsystem 118. The strike sensors for the right and left sides of the cleaning subsystem 118 may provide individual signals or a combined or aggregated signal. In some examples, sensors 152 may include a single sensor as opposed to separate sensors provided for each cleaning subsystem 118.

Separator loss sensor 148 provides a signal indicative of grain loss in the left and right separators, not separately shown in FIG. 2. The separator loss sensors 148 may be associated with the left and right separators and may provide separate grain loss signals or a combined or aggregate signal. In some instances, sensing grain loss in the separators may also be performed using a wide variety of different types of sensors as well.

Clean grain camera 150 illustratively observes the grain that is being conveyed into or has been conveyed into clean grain tank 132. Clean grain camera 150 may detect various characteristics, such as the cleanliness of the grain within or being conveyed to clean grain tank 132. For example, clean grain camera 150 may capture images of MOG comingled with the grain within or being provided to clean grain tank 132. An image processing system can then identify the color of the MOG and/or the leaf-to-stalk ratio of the MOG in the images taken by any of the cameras 150, 151, etc. Based on the color and/or leaf-to-stalk ratio (the color of the MOG and the leaf-to-stalk ratio in the MOG being collectively referred to herein as the content characteristics of the MOG) control signals can be generated to control the deck plates on header 104, the back shaft speed, etc.

Observation sensor systems 151 are disposed to observe various characteristics at the worksite. For example, observation sensor systems 151 may be mounted on self-propelled portion 102 and/or header 104 and may detect characteristics around harvester 100 as well as characteristics on harvester 100 (e.g., characteristics on header 104). For example, one observation sensor system 151 may be disposed to detect characteristics occurring at or on header 104, such as grain loss, content characteristics of MOG on header 104, stalk diameter, ear size, as well as various other characteristics. Another observation sensor system 151 may be disposed to view crop ahead of harvester 100 and/or to view rearwardly of the harvester 100 to detect various characteristics such as the color of the crop leaves, the content characteristics of residue, as well as grain loss (an amount of grain being output with the residue). These are merely some examples. Observation sensor systems 151 may comprise or may include one or a combination of camera(s) (e.g., mono or stereo camera(s), etc.), Lidar, Radar, Ultrasonic sensors, as well as various other sensors that are configured to emit and/or receive electromagnetic radiation. System 151 can also include signal processing systems (such as image processing systems, etc.).

Harvester 100 can include various other sensors, some of which will be discussed below.

Figure 3:
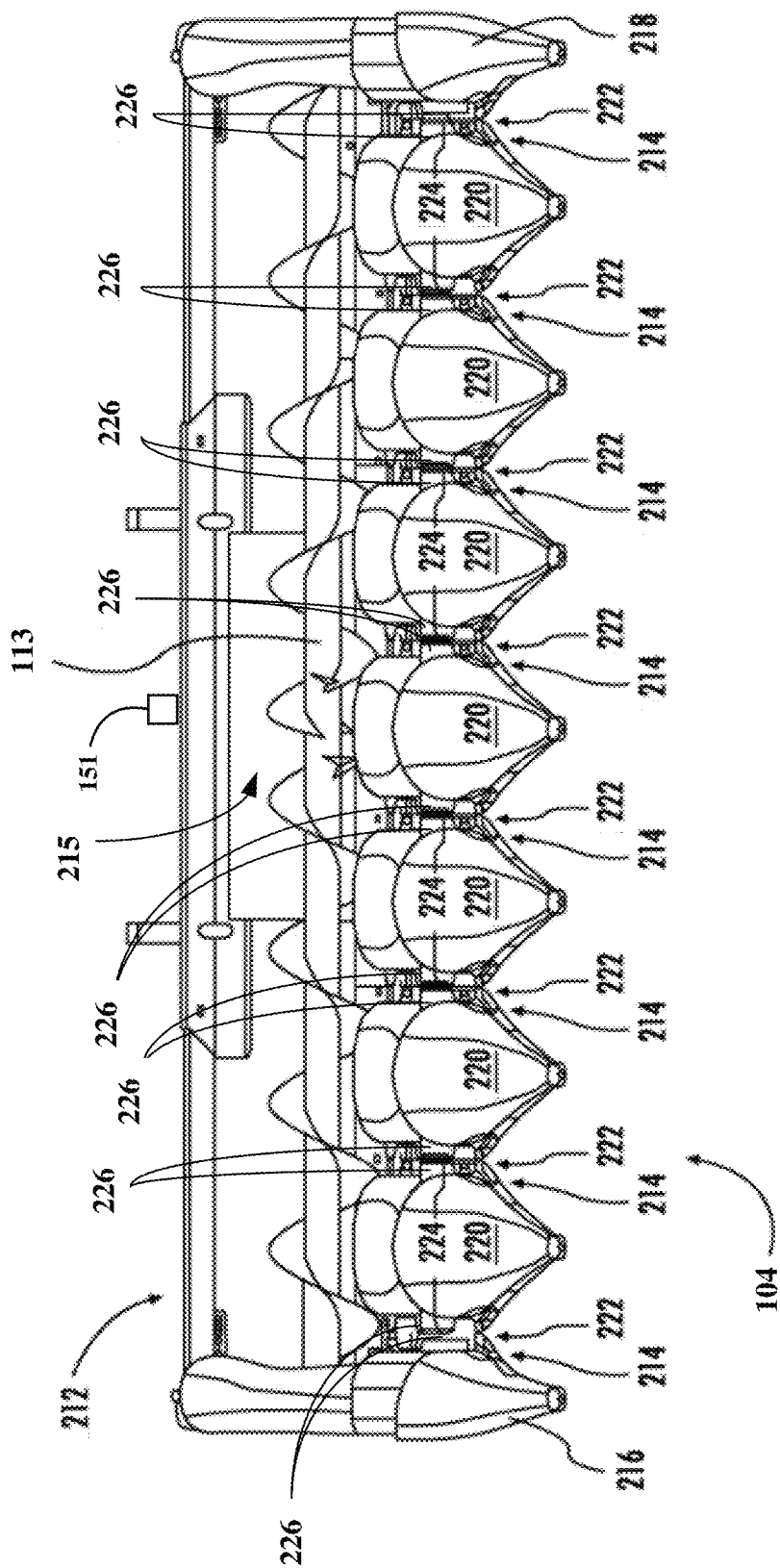
FIG. 3 illustrates one example of a header of an agricultural harvester.

FIG. 3 is a front view of header 104. As illustrated in FIG. 3, header 104 includes a frame 212, a cross-auger 113, an opening 215, a first end divider 216, a second end divider 218, a plurality of central dividers 220, a plurality of row units 214, a plurality of crop receiving passages 222, a plurality of deck plates 226, and a plurality of gaps (or throats) 224. Each row unit 214 includes either two central dividers 220 or a central divider 220 and an end divider or end fender (one of 216 or 218). Each row unit 214 is configured to process corn plants from a respective plant row. As the corn plants are received by the row units 214 and proceed through respective crop receiving passages 222, the stalks of the corn plants are severed and the corn ears are separated from the corn plants. The severed corn ears are conveyed to cross auger 113 which rotates to convey the corn ears to opening 215 which, when header 104 is coupled to self-propelled portion 102, is in communication with feeder house 106. The feeder house 106 can include further crop conveyance components (such as a belt or elevator) which deliver the corn ears further into the harvester 100 for further processing. Each operative pair of deck plates 226 are spaced apart to define a respective gap 224 which form a portion of a respective crop receiving passage 222. While not shown in FIG. 3, it will be understood that each row unit 214 further includes a set of crop gathering components (such as a set of gathering chains) and a set of rollers.

Figure 4:
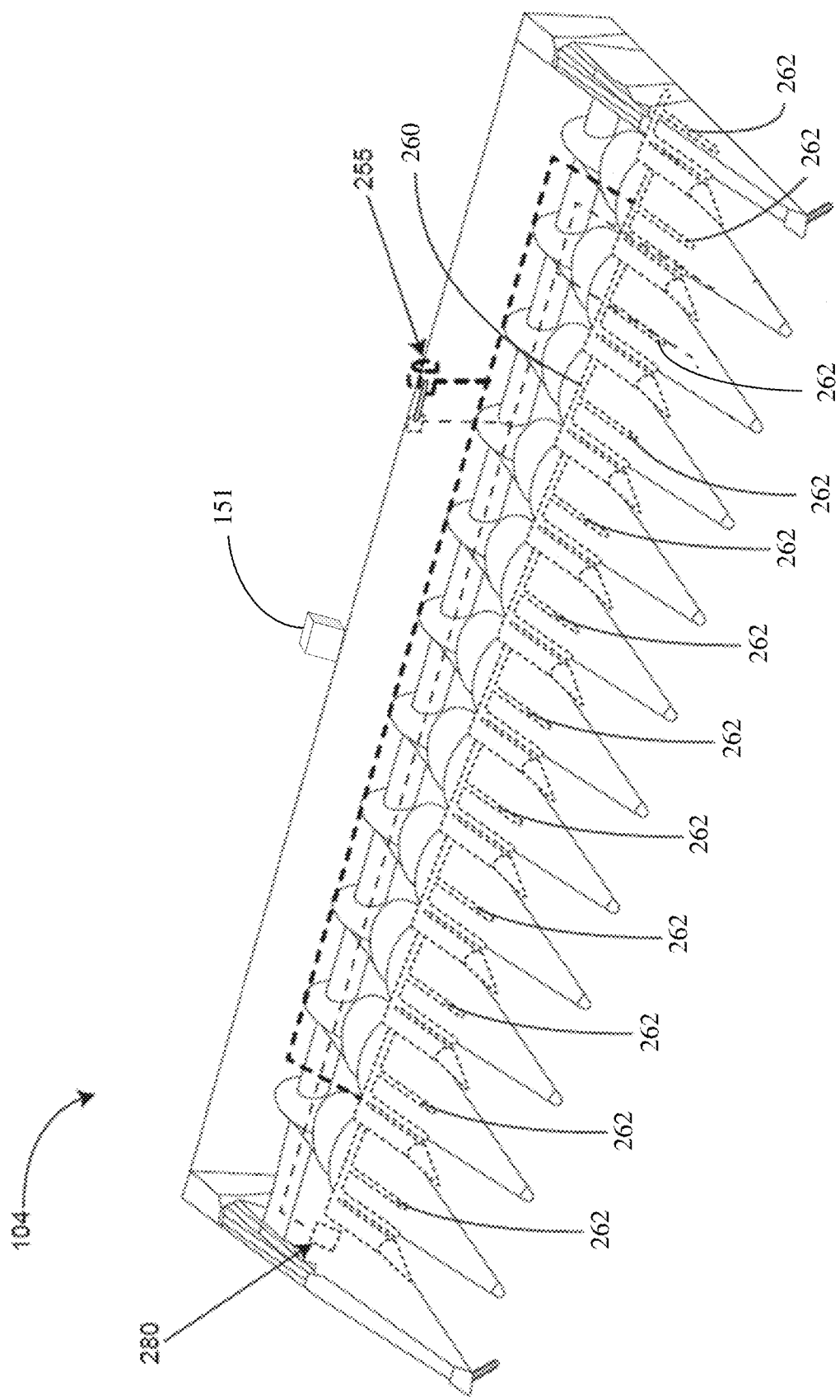
FIG. 4 is a partial pictorial, partial schematic illustration of one example of the header shown in FIG. 3.

FIG. 4 is a partial pictorial, partial schematic illustration showing one example of header 104. As shown in FIG. 4, header 104 includes a deck plate position sensor 280, and a deck plate actuator 255.

A deck plate subsystem can be controlled to adjust the position of the deck plates. The deck plate subsystem includes deck plate actuator 255, linkage 260, a plurality of sub-linkages 262, as well as a plurality of actuatable deck plates (226 shown in FIG. 3). In the illustrated example, deck plate actuator 255 is a hydraulic actuator (though in other examples could be other types of actuators) that causes movement of linkage 260. Linkage 260 spans a width of header 104 (e.g., spans at least the width of the row units 214). For each row unit, a sub-linkage 262 is coupled, at one end, to the linkage 260 and at another end to a deck plate. Movement of the linkage 260 causes movement of the sub-linkages 262 and corresponding movement of the deck plates. In the illustrated example, for each set of deck plates, one deck plate is fixed while the other deck plate, coupled to the sub-linkage 262, is movable to change its position and thus spacing between the deck plates. This is just one example.

In generating the control signal to control the deck plate subsystem, a controller (discussed in more detail with respect to FIGS. 6-7 below) can also account for a current position of the deck plates, as detected by deck plate position sensor 280. Deck plate position sensor 280 illustratively detects a position (or spacing) of the deck plates and provides a sensor signal indicative of the detected position (or spacing) to the controller. After the position is adjusted, deck plate position sensor 280 can detect the adjusted position of the deck plates for compliance with the position commanded by the controller. In the illustrated example, deck plate position sensor 280 is a rotary encoder that detects motion of linkage 260. In other examples, the position of the deck plates can be controlled in an open loop fashion without a deck plate position sensor 280.

Further, header 104 can include two or more deck plate position sensors 280, each corresponding to a different row unit (i.e., a different set of deck plates). Additionally, there may be multiple deck plate controllers, such as a deck plate controller for each set of a deck plates, or a plurality of deck plate controllers, each deck plate controller of the plurality of deck plate controllers responsible for a respective plurality of individual sets of deck plates. Various arrangements of the header 104 and deck plate control are contemplated herein, including simultaneous positioning of all deck plates (as illustrated), separate positioning for subsets of the sets of deck plates (e.g., sectional control, wherein each section includes a corresponding plurality of sets of deck plates), as well as separate and individual control of the position each set of deck plates. Depending on the control arrangement, the number of sensors 280, actuators 255, and controllers may vary.

Figure 5:
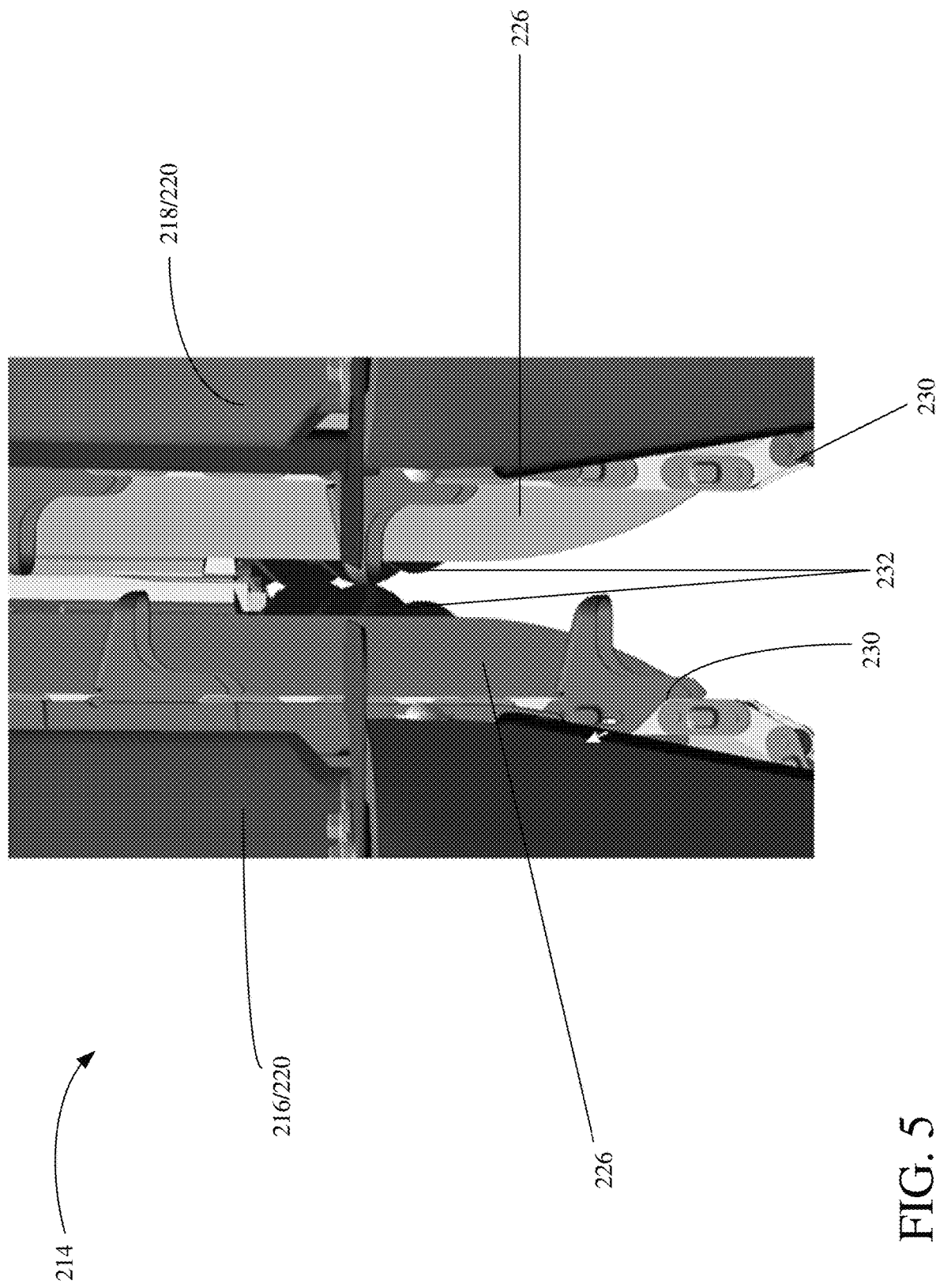
FIG. 5 shows one example of a row unit of the header illustrated in previous figures.

FIG. 5 illustrates one example of a row unit 214 of header 104. As illustrated in FIG. 5, row unit 214 includes a pair of deck plates 226, a pair of gathering chains 230, and a pair of stalk rollers 232. Also, as illustrated in FIG. 5 it can be seen that each row unit 214 can include either two central dividers 220 or a central divider 220 and an end fender 216 or 218.

Figure 6A:
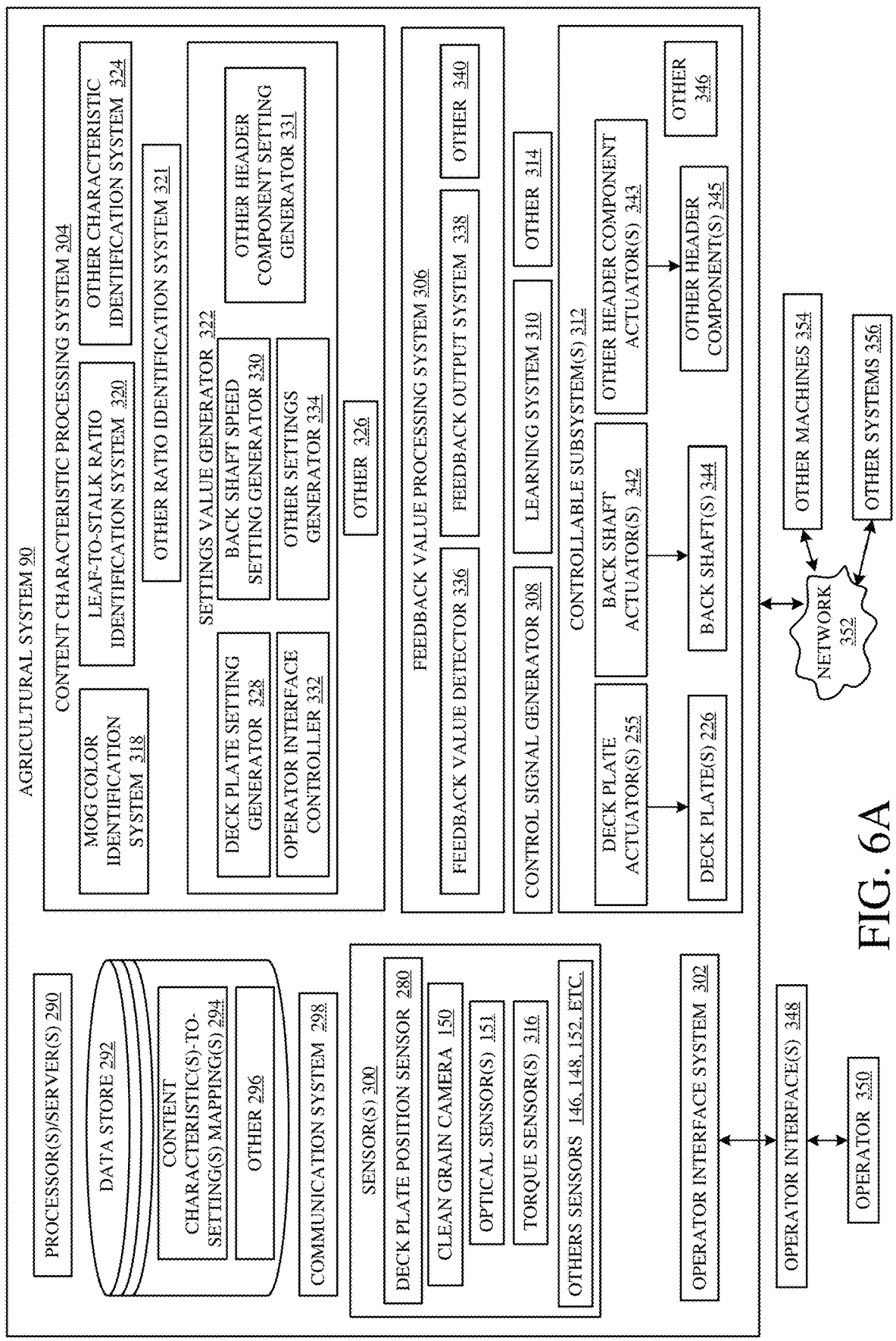
FIG. 6A is a block diagram showing one example of an agricultural system.

FIG. 6A is a block diagram showing one example of agricultural system 90 in more detail. Items in agricultural system 90 may be disposed on self-propelled portion 102 of agricultural harvester 100, on header 104, or at other machines 354 or other systems 356 that may be remote from agricultural harvester 100 (such as in a remote server environment, in a farm manager system, etc.). Some items in FIG. 6A are similar to those shown in previous figures, and are similarly numbered. In the example shown in FIG. 6A, agricultural system 100 can include one or more processors or servers 290, data store 292 (which can include content characteristics-to-settings mappings 294 and other items 296), communication system 298, sensors 300, operator interface system 302, content characteristic processing system 304, feedback value processing system 306, control signal generator 308, learning system 310, controllable subsystems 312, and other items 314. Sensors 300 can include deck plate position sensors 280, clean grain camera 150, optical sensor systems 151, one or more torque sensors 316, and other sensors 146, 148, 152, etc. Content characteristic processing system 304 can include MOG color identification system 318, leaf-to-stalk ratio identification system 320, other ratio identification system 321, settings value generator 322, other characteristic identification system 324, and other items 326. Settings value generator 322 includes deck plate setting generator 328, back shaft speed setting generator 330, other header component setting generator 331, operator interface controller 332, and other settings generator 334. Feedback value processing system 306 can include feedback value detector 336, feedback output system 338, and other items 340. Controllable subsystems 312 can include deck plate actuators 255, deck plates 226, one or more back shaft actuators 342, one or more back shafts 344, other header component actuator(s) 343, other header component 345, and other items 346. FIG. 6A also shows that operator interface system 302 can generate one or more operator interfaces 348 for interaction by operator 350. Operator 350 can thus interact with operator interfaces 348 to control and manipulate portions of agricultural system 90. FIG. 6A also shows that agricultural system 90 can communicate over network 352 with one or more other machines 354 and/or other systems 356. Other machines 354 may be other machines operating in the same field as agricultural system 90, tender vehicles, or other machines. Other systems 356 can include farm manager systems, vendor or manufacturer systems, maintenance systems, or other systems. Therefore, network 352 can include a local area network, a wide area network, a near field communication network, a Wi-Fi or Bluetooth network, a cellular communication network, and/or any of a wide variety of different types of networks or combinations of networks. Before describing the overall operation of agricultural system 90, a description of some of the items in system 90, and their operation, will first be provided.

Content characteristics-to-settings mappings 294 may map the content characteristics (e.g., the MOG color identified by MOG color identification system 318 and/or the leaf-to-stalk ratio identified by leaf-to-stalk ratio identification system 320) to a settings value for one or more different settings, such as the settings for deck plate actuators 255, back shaft actuators 342, etc. Communication system 298 may facilitate communication of the items of agricultural system 190 with one another, and communication over network 352. Therefore, communication system 298 can be a controller area network (CAN) bus and bus controller, and/or a communication system for communicating over the network 352. Thus, the functionality of communication system 298 may vary based upon the types of networks 352 over which communication is to be enabled. Deck plate position sensor 280, clean grain camera 150, optical sensors 151, and/or sensors 146, 148, 152, etc. are described in more detail elsewhere herein. Torque sensor 316 may sense the torque on cross auger 113, on the thresher drive that drives threshing rotor 112, or any of the other conveyance mechanisms that convey and/or process harvested material through harvester 100. The torque sensors 316 may sense torque on the output of a motor or other drive mechanism that is driving the conveyors or other processing systems. The torque sensors 316 may be on a drive shaft or on a conveyor itself, or otherwise. Torque sensors 316 generate one or more output signals indicative of the sensed torque. It will be noted that torque sensor 316 may generate a signal indicative of force used to process the crop and may thus be a signal representing torque power, energy, speed, or another value. Also torque sensor 316 may be a direct measurement or an indirect measurement (such as by sensing rotor torque by sensing a pressure value on a drive belt that drives the rotor, etc.) The torque signal may be significantly impacted by the content characteristics of the MOG. For instance, green leaf content will significantly affect the amount of power or torque needed to process the crop. Therefore, the torque sensed on cross auger 113 may, for example, be indicative of the content characteristics of the MOG being moved by cross auger 113, or may be indicative of other items as well.

Operator interface system 302 can include any of a wide variety of different mechanisms for generating outputs to operator 350 and receiving inputs from operator 350. Therefore, operator interface system 302 can include a steering wheel, joysticks, levers, pedals, knobs, buttons, a display screen, a speaker, and/or other items for generating audio/visual, and/or haptic outputs and for receiving inputs from operator 350. Operator interfaces 348 may be displayed on a display screen and include operator actuatable mechanisms, such as icons, links, buttons, drop down menus, etc. The operator actuatable mechanisms can be actuated using a point and click device, using voice commands, using touch gestures, etc.

Content characteristic processing system 304 may receive inputs from one or more sensors 300 and identify content characteristics (MOG color and/or leaf-to-stalk ratio) in the MOG based upon the sensor signals. For instance, optical sensor 151 may capture images of MOG at various points within harvester 100, images of the crop head of harvester 100, images of residue being expelled from harvester 100, images of material on header 104 or at various points in the stream of material being processed and conveyed through self-propelled portion 102 of harvester 100. MOG color identification system 318 can be an image processing system, such as a convolutional neural network or another machine learning or deep learning system, that identifies material other than grain in the images, and identifies an output indicative of the color of the MOG. Leaf-to-stalk identification system 320 may also receive an input indicative of the captured images and identify parts of the MOG corresponding to leaf, and parts of the MOG corresponding to stalk, and generate an output indicative of the leaf-to-stalk ratio in the MOG. Thus, system 320 may also be a convolutional neural network, or another type of machine learning or deep learning system or another system. Other ratio identification system 321 can identify other ratios indicative of content characteristics of the MOG, such as a leaf-to-grain ratio of material on the cleaning shoe 118 or going to the separator 116, a stalk-to-ear ratio, an overall MOG-to-grain ratio, an overall MOG-to-ear ratio, etc. Systems 318, 320, and/or 321 may process other sensor signals to identify content characteristics of the MOG. For instance, the torque sensed by torque sensor 316 (alone or in combination with other information) may be indicative of the color of the MOG (e.g., the signaling may be indicative of higher or lower moisture in the MOG which, itself, may be indicative of MOG color). In another example, the sensed torque may be indicative of the leaf-to-stalk ratio (e.g., stalk material may be more difficult to process than leaf material or vice versa). To the extent that other characteristics of the MOG are to be identified, other characteristic identification system 324 may process the images or other sensor signals to identify those characteristics.

It will also be appreciated that systems 318, 320, and/or 321 can utilize various sensor signal filtering functionalities, noise filtering functionalities, sensor signal categorization, aggregation, normalization, as well as various other processing functionalities. Similarly, systems 318, 320, and/or 321 can utilize various image processing techniques such as, sequential image comparison, RGB, edge detection, black/white analysis, machine learning, neural networks, pixel testing, pixel clustering, shape detection, as well as any number of other suitable image processing and data extraction functionalities.

Based upon the content characteristics of the MOG, settings value generator 322 generates an output indicative of the settings values. Control signal generator 308 then generates a control signal to control controllable subsystems 312 based upon the settings values. Thus, deck plate setting generator 328 generates an output indicative of the deck plate spacing. Control signal generator 308 then generates a control signal to control deck plate actuators 255 to control the spacing of deck plates 226. To generate such an output, deck plate setting generator 328 can receive the values corresponding to the content characteristics of the MOG and access the mappings 294 to identify the deck plate settings. Deck plate setting generator 328 can also employ a model, rules, or other correlations that can be used to receive the content characteristics of the MOG and generate a deck plate setting based upon those content characteristics. Back shaft speed setting generator 330 receives the content characteristics of the MOG and generates an output that can be used to set the speed of the back shaft 344. Thus, back shaft speed setting generator 330 may receive an input indicative of the content characteristics of the MOG and access mappings 294 or generate the back shaft speed settings using a model, using one or more rules, etc.

Operator interface controller 332 can control operator interface system 302 to generate one or more operator interfaces 348 to display the content characteristics of the MOG, to display the settings values generated by settings value generator 322, and/or to otherwise provide an output to operator 350 indicative of the content characteristics of the MOG, the settings values, etc. The interface may be interactive so that operator 350 can authorize the settings, change the settings, etc.

Other header component setting generator 331 generates outputs indicative of value that can be used to generate control signals to control other header component actuators 343 to control other header components 345.

Based upon the outputs from content characteristic processing system 304, control signal generator 308 generates control signals to control the controllable subsystems 312. Thus, control signal generator 308 generates control signals to control deck place actuators 255 to control deck plate spacing and/or back shaft actuators 342 to control the speed of back shaft 344. Control signal generator 308 can generate other control signals (such as to control operator interface mechanism 302, communication system 298, other header component actuators 343 etc.).

Feedback value processing system 308 receives the settings values from content characteristic processing system 304 and generates and outputs a feedback value. Feedback value detector 336 evaluates the settings generated for controllable subsystems 312 against feedback metrics, such as grain loss, clean grain quality, etc. Based on that evaluation, feedback value detector 336 detects any adjustments that should be made to the control signals generated by control signal generator 308 in controlling controllable subsystems 312. For instance, if feedback detector 336 determines that the loss is too high, this may indicate that the deck plate position needs to be adjusted in a certain manner. Other feedback values can be generated as well. Feedback output system 338 generates an output indicative of the feedback value (e.g., the amount by which a controllable subsystem is to be adjusted based upon the feedback evaluation) to control signal generator 308. The feedback value can also be fed back to settings value generator 322 which can modify the settings that are generated based on the feedback.

Learning system 310 may be a machine learning system, or another system that can be used to learn and/or modify the content characteristics-to-settings mappings 294 based upon the feedback values, the output values generated by content characteristic processing system 304, the control signals generated by control signal generator 308, and/or based upon a set of learning criteria, such as loss, grain quality, force/torque/power consumption, etc.

Deck plate actuators 255 can be hydraulic actuators, pneumatic actuators, electric actuators, or other actuators. Back shaft actuators 342 can be a power takeoff, or another hydraulic, pneumatic, electric or other actuator.

Figure 6B:
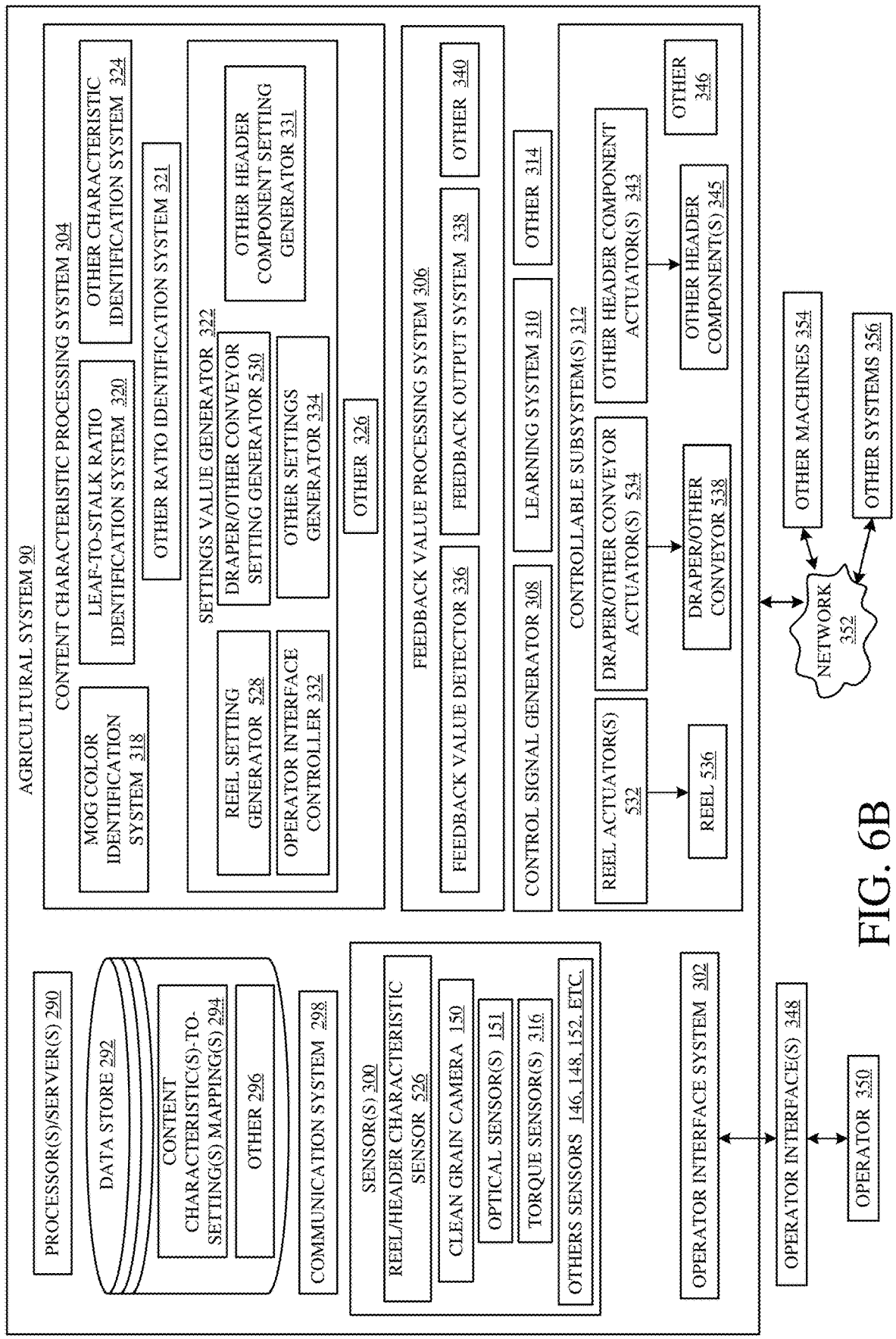
FIG. 6B is a block diagram showing another example of an agricultural system.

FIG. 6B is similar to FIG. 6A, and similar items are similarly numbered. However, in FIG. 6B, the self-propelled portion 100 of harvester 90 is fitted with a different header that is suited to harvest grains, such as a soybeans, wheat, barley, canola, etc. Therefore, the controllable subsystems 312 include reel actuators 532 that actuate a reel 536 as well as draper/other conveyor actuators 534 that actuate a draper or other conveyor 538 on the header. The reel 536 may be pivotally coupled to the rest of the header so that it can be raised and lowered by reel actuators 532 which can include actuators such as a hydraulic cylinder, a pneumatic actuator, an electric actuator, or other actuators. Actuators 532 can raise and lower reel 536, for instance, relative to a cutter on the header. Reel actuators 532 may also include a reel speed actuator that controls the speed and direction of reel 536. The reel speed actuator may include a hydraulic motor, a pneumatic motor, an electric motor, among others. The reed actuators 532 may include fore-to-aft position actuators that controllably drive movement of reel 536 in a fore or aft direction. The reel actuators 532 may include reel finger actuators which can be controlled to adjust the orientation of fingers disposed on reel 536 as well. Draper/other conveyor actuators 534 may be actuators that drive movement of a draper or other conveyor 538 which moves crop toward a center of the header so that it can be transferred into the feeder house. Actuators 534 may be actuated to control the speed and direction of movement of the draper or other conveyor 538.

Other header component actuators 343 can include orientation actuators that drive the position and orientation of the header or header components.

Also, in one example, other controllable subsystems 346 can include subsystems that are controlled using settings, such as the material handling subsystem 125, cleaning subsystem 118, the threshing subsystem 110, the residue handling subsystem 138, among any of a wide variety of other subsystems.

FIG. 6B also shows that sensors 300 can include one or more reel/header characteristic sensors 526. Sensors 526 may sense different characteristics of the reel or header components, such as reel or header speed and direction of travel, the speed and direction of travel of the conveyor or draper belt, the orientation of the header, the reel, or other components, among other things.

FIG. 6B also shows that setting value generator 322 includes reel setting generator 528 which can generate settings for reel actuators 532 and reel 536. Draper/other conveyor setting generator 530 can generate outputs for the draper/other conveyor actuators 534 as well as the draper or other conveyors 538. Other settings generator 334, in the example shown in FIG. 6B, can generate outputs for controlling the settings of other controllable subsystems 346 or other header components 345.

Figure 7:
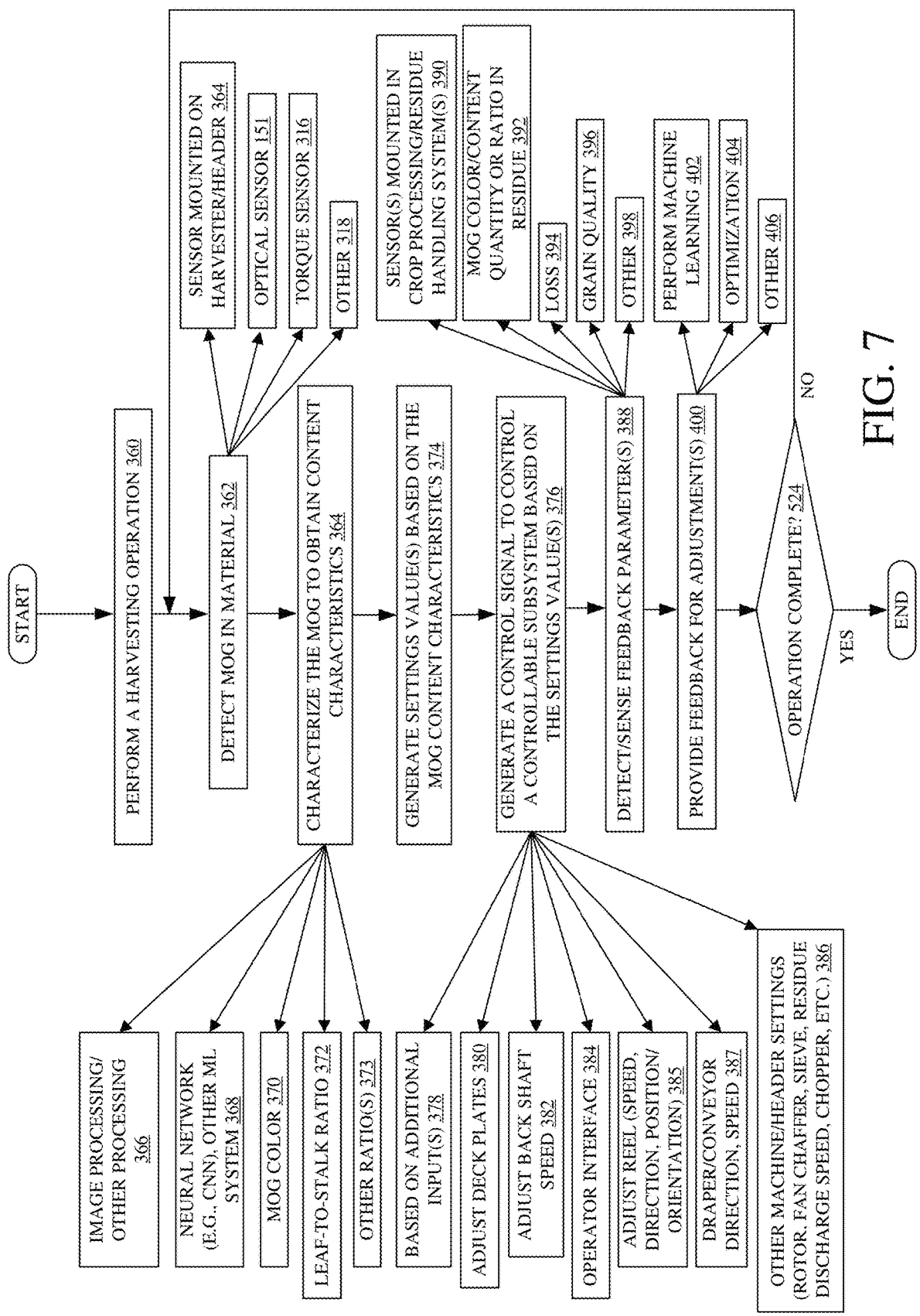
FIG. 7 is a flow diagram illustrating one example of the operation of the agricultural systems illustrated in FIGS. 6A and 6B.

FIG. 7 is a flow diagram illustrating one example of the operation of agricultural system 90 in more detail. It is first assumed that agricultural harvester 100 is performing a harvesting operation, as indicated by block 360 in the flow diagram of FIG. 7. One or more of sensors 300 (e.g., clean grain camera 150, optical sensors 151, torque sensors 316, etc.) detect MOG in material, as indicated by block 362 in the flow diagram of FIG. 7. In one example, the sensors include a sensor mounted on harvester 100, such as on the self-propelled portion 102 or header 104, as indicated by block 364. The MOG sensor can be an optical sensor 151, a torque sensor 316, or any of a wide variety of other sensors 318, that generate a sensor signal that can be used to identify the content characteristics of the MOG.

The sensor signal is output to content characteristic processing system 304 which then characterizes the MOG to obtain the MOG content characteristics, as indicated by block 364 in the flow diagram of FIG. 7. For example, the content characteristic processing system 304 can include image processing functionality or other processing that processes the sensor signals to identify the content characteristics of the MOG. Using image processing or other processing or analysis systems is indicated by block 366 in the flow diagram of FIG. 7. The content characteristic processing system 304 can include a neural network (such as a convolutional neural network—CNN), or another machine learning system or deep learning system, a model, a rules-based system, or other systems as indicated by block 368. The content characteristic processing system 304 can include MOG color identification system 318 that identifies the MOG color, as indicated by block 370 in the flow diagram of FIG. 7. The content characteristic processing system 304 can include the leaf-to-stalk ratio identification system 320 that identifies the leaf-to-stalk ratio in the MOG, as indicated by block 372, or other ratio identification system 321, as indicated by block 373.

Settings value generator 322 then generates one or more settings values based upon the MOG content characteristics, as indicated by block 374 in the flow diagram of FIG. 7. Control signal generator 308 also generates a control signal to control one or more of the controllable subsystems 312 based upon the settings values output by settings value generator 322. Generating a control signal is indicated by block 376 in the flow diagram of FIG. 7. It will be noted that the control signal generated by control signal generator 308 and/or the settings values generated by settings value generator 322 may be based on additional inputs, in addition to the content characteristics of the MOG. Generating such values based upon additional inputs is indicated by block 378 in the flow diagram of FIG. 7. For instance, such values may be generated also based on inputs from any of the sensors 300.

The control signal may be generated to control deck plate actuators 255 to adjust the deck plates 226, as indicated by block 380. The control signals may be generated to control back shaft actuators 342 to control the speed of back shaft 344, as indicated by block 382 in the flow diagram of FIG. 7. The control signals may be generated to control operator interface system 302 in order to display or otherwise output the content characteristics, the settings values, the control signal values, etc., on one or more operator interfaces 348, as indicated by block 384 in the flow diagram of FIG. 7. The control signals can be generated to control reel actuators 532 to adjust reel 536, such as to control the direction and speed of rotation of reel 536, as indicated by block 385. The control signals can be generated to control draper/conveyor actuator 534 to adjust the speed and direction of travel of draper or other conveyor 538, as indicated by block 387 in FIG. 7. The control signals can be generated to control any of a wide variety of other machine settings, such as the actuation, position, and orientation of the header or header components, rotor settings, fan settings, chaffer settings, sieve settings, residue discharge speed settings, chopper settings, etc., as indicated by block 386 in the flow diagram of FIG. 7.

Feedback value processing system 308 can also detect or sense feedback parameters to generate a feedback value for adjustment of the settings values, the mappings 294, or other items. Detecting/sensing feedback parameters is indicated by block 388 in the flow diagram of FIG. 7. The feedback values may be generated based upon sensor signals from sensors 300 mounted in the crop processing and/or residue handling subsystems on harvester 100, as indicated by block 390 in the flow diagram of FIG. 7. The feedback values may be generated based upon the MOG color and/or MOG content quantity, or ratio in the residue generated by harvester 100, as indicated by block 392. The feedback values may be generated based upon sensed loss 394 and/or grain quality 396, or based on any of a wide variety of other criteria 398.

Feedback output system 338 then generates an output to provide feedback for various adjustments. Providing feedback for adjustments is indicated by block 400 in the flow diagram of FIG. 7. As discussed above, the feedback can be provided to learning system 310 which may perform machine learning to modify mappings 394 or other settings. Performing machine learning based upon the feedback is indicated by block 402. The feedback may be provided to optimize various criteria, such as grain loss, grain quality, or other criteria, as indicated by block 404. The feedback may be provided to other systems for adjustment as well, as indicated by block 406. Until the operation is complete, as determined by block 408, processing reverts to block 362 where the MOG is detected.

It can thus be seen that the present description describes a system that controls controllable subsystems on a harvester based upon content characteristics of MOG which include MOG color and/or leaf-to-stalk ratio in the MOG. The content characteristics can be used to make adjustments in controlling harvester 100, such as on header 104, or on self-propelled portion 102 of harvester 100. For instance, the content characteristics can be used to control the position of deck plates 226, the speed of back shaft 344, reel and draper operation, or other controllable subsystems 312.

The present discussion has mentioned processors and servers. In some examples, the processors and servers include computer processors with associated memory and timing circuitry, not separately shown. The processors and servers are functional parts of the systems or devices to which they belong and are activated by and facilitate the functionality of the other components or items in those systems.

Also, a number of user interface (UI) displays have been discussed. The (UI) displays can take a wide variety of different forms and can have a wide variety of different user actuatable operator interface mechanisms disposed thereon. For instance, user actuatable operator interface mechanisms may include text boxes, check boxes, icons, links, drop-down menus, search boxes, etc. The user actuatable operator interface mechanisms can also be actuated in a wide variety of different ways. For instance, the mechanisms can be actuated using operator interface mechanisms such as a point and click device, such as a track ball or mouse, hardware buttons, switches, a joystick or keyboard, thumb switches or thumb pads, etc., a virtual keyboard or other virtual actuators. In addition, where the screen on which the user actuatable operator interface mechanisms are displayed is a touch sensitive screen, the user actuatable operator interface mechanisms can be actuated using touch gestures.

Also, user actuatable operator interface mechanisms can be actuated using speech commands using speech recognition functionality. Speech recognition may be implemented using a speech detection device, such as a microphone, and software that functions to recognize detected speech and execute commands based on the received speech.

A number of data stores have also been discussed. It will be noted the data stores can each be broken into multiple data stores. In some examples, one or more of the data stores may be local to the systems accessing the data stores, one or more of the data stores may all be located remote form a system utilizing the data store, or one or more data stores may be local while others are remote. All of these configurations are contemplated by the present disclosure.

Also, the figures show a number of blocks with functionality ascribed to each block. It will be noted that fewer blocks can be used to illustrate that the functionality ascribed to multiple different blocks is performed by fewer components. Also, more blocks can be used illustrating that the functionality may be distributed among more components. In different examples, some functionality may be added, and some may be removed.

It will be noted that the above discussion has described a variety of different systems, components, logic, generators, sensors, and interactions. It will be appreciated that any or all of such systems, components, logic, generators, sensors, and interactions may be implemented by hardware items, such as one or more processors, one or more processors executing computer executable instructions stored in memory, memory, or other processing components, some of which are described below, that perform the functions associated with those systems, components, logic, generators, or interactions. In addition, any or all of the systems, components, logic, generators, sensors, and interactions may be implemented by software that is loaded into a memory and is subsequently executed by one or more processors or one or more servers or other computing component(s), as described below. Any or all of the systems, components, logic, generators, sensors, and interactions may also be implemented by different combinations of hardware, software, firmware, etc., some examples of which are described below. These are some examples of different structures that may be used to implement any or all of the systems, components, logic, generators, sensors, and interactions described above. Other structures may be used as well.

Figure 8:
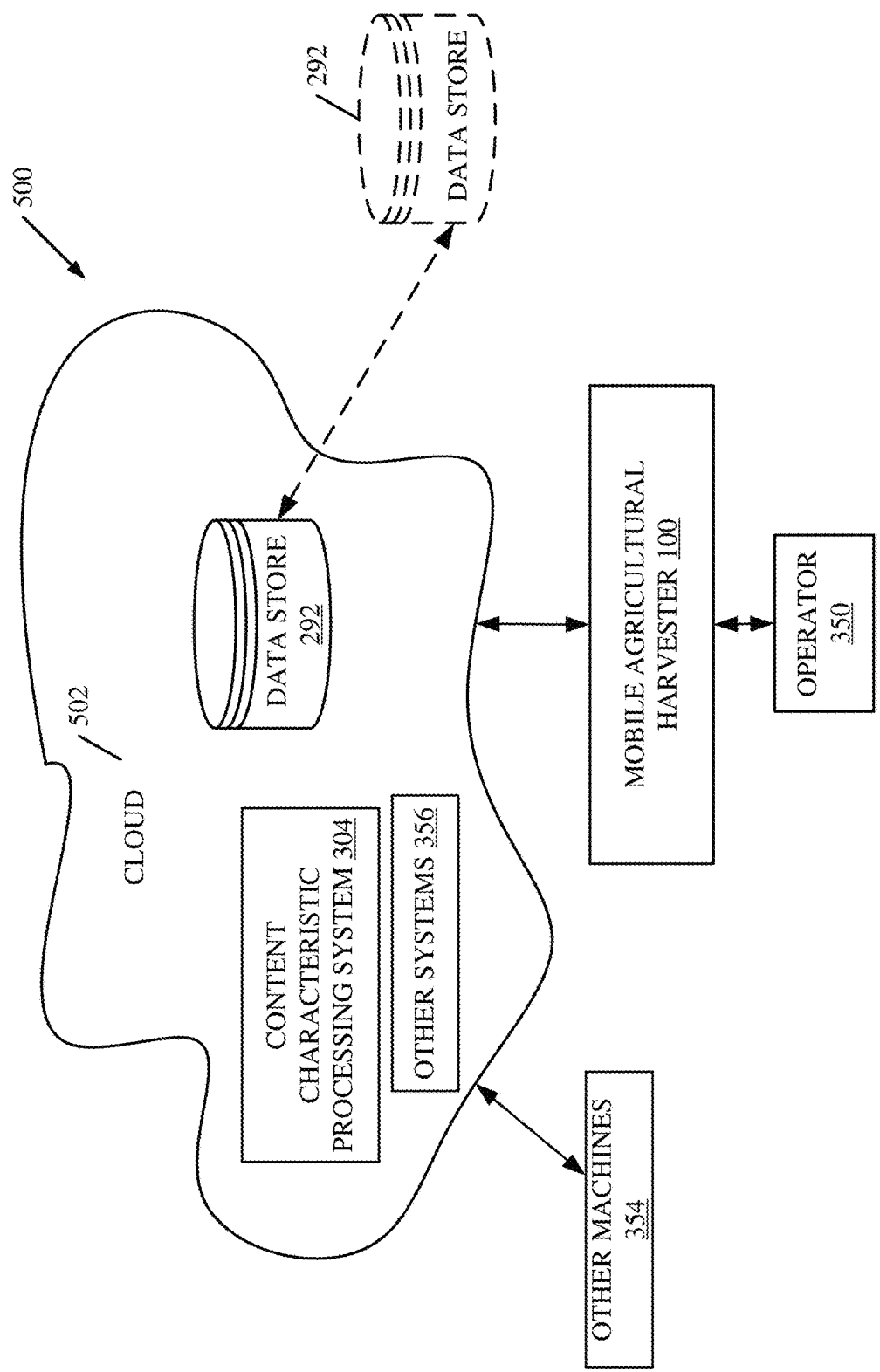
FIG. 8 is a block diagram of a remote server environment.

FIG. 8 is a block diagram of mobile agricultural harvester 100 (also referred to as harvester 100), which may be similar to mobile agricultural harvesting machine 100 shown in previous FIGS. The mobile agricultural harvester 100 communicates with elements in a remote server architecture 500. In some examples, remote server architecture 500 provides computation, software, data access, and storage services that do not require end-user knowledge of the physical location or configuration of the system that delivers the services. In various examples, remote servers may deliver the services over a wide area network, such as the internet, using appropriate protocols. For instance, remote servers may deliver applications over a wide area network and may be accessible through a web browser or any other computing component. Software or components shown in previous figures as well as data associated therewith, may be stored on servers at a remote location. The computing resources in a remote server environment may be consolidated at a remote data center location, or the computing resources may be dispersed to a plurality of remote data centers. Remote server infrastructures may deliver services through shared data centers, even though the services appear as a single point of access for the user. Thus, the components and functions described herein may be provided from a remote server at a remote location using a remote server architecture. Alternatively, the components and functions may be provided from a server, or the components and functions can be installed on client devices directly, or in other ways.

In the example shown in FIG. 8, some items are similar to those shown in previous figures and those items are similarly numbered. FIG. 8 specifically shows that content characteristic processing system 304 may be located at a server location 502 that is remote from the harvester 100. Therefore, in the example shown in FIG. 8, harvester 100 accesses systems through remote server location 502. In other examples, various other items may also be located at server location 502, such as data store 292, system 304 (or components thereof), as well as various other items.

FIG. 8 also depicts another example of a remote server architecture. FIG. 8 shows that some elements of previous figures may be disposed at a remote server location 502 while others may be located elsewhere. By way of example, data store 292 may be disposed at a location separate from location 502 and accessed via the remote server at location 502. Regardless of where the elements are located, the elements can be accessed directly by harvester 100 through a network such as a wide area network or a local area network; the elements can be hosted at a remote site by a service; or the elements can be provided as a service or accessed by a connection service that resides in a remote location. Also, data may be stored in any location, and the stored data may be accessed by, or forwarded to, operators, users, or systems. All of these architectures are contemplated herein.

It will also be noted that the elements of previous figures, or portions thereof, may be disposed on a wide variety of different devices. One or more of those devices may include an on-board computer, an electronic control unit, a display unit, a server, a desktop computer, a laptop computer, a tablet computer, or other mobile device, such as a palm top computer, a cell phone, a smart phone, a multimedia player, a personal digital assistant, etc.

In some examples, remote server architecture 500 may include cybersecurity measures. Without limitation, these measures may include encryption of data on storage devices, encryption of data sent between network nodes, authentication of people or processes accessing data, as well as the use of ledgers for recording metadata, data, data transfers, data accesses, and data transformations. In some examples, the ledgers may be distributed and immutable (e.g., implemented as blockchain).

Figure 9:
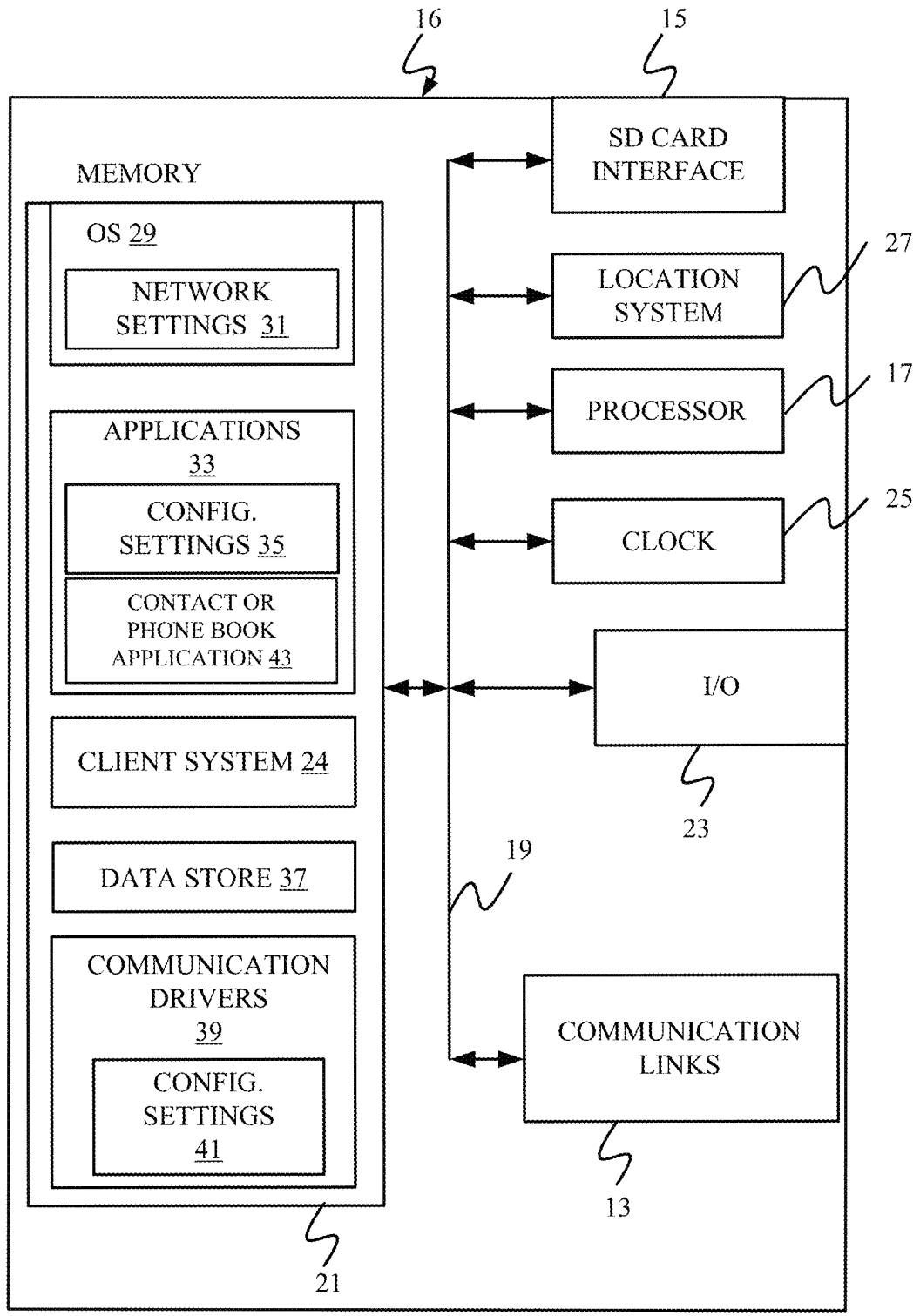
FIGS. 9, 10, and 11 are examples of mobile devices that can be used in systems and environments in other FIGS.
Figure 10:
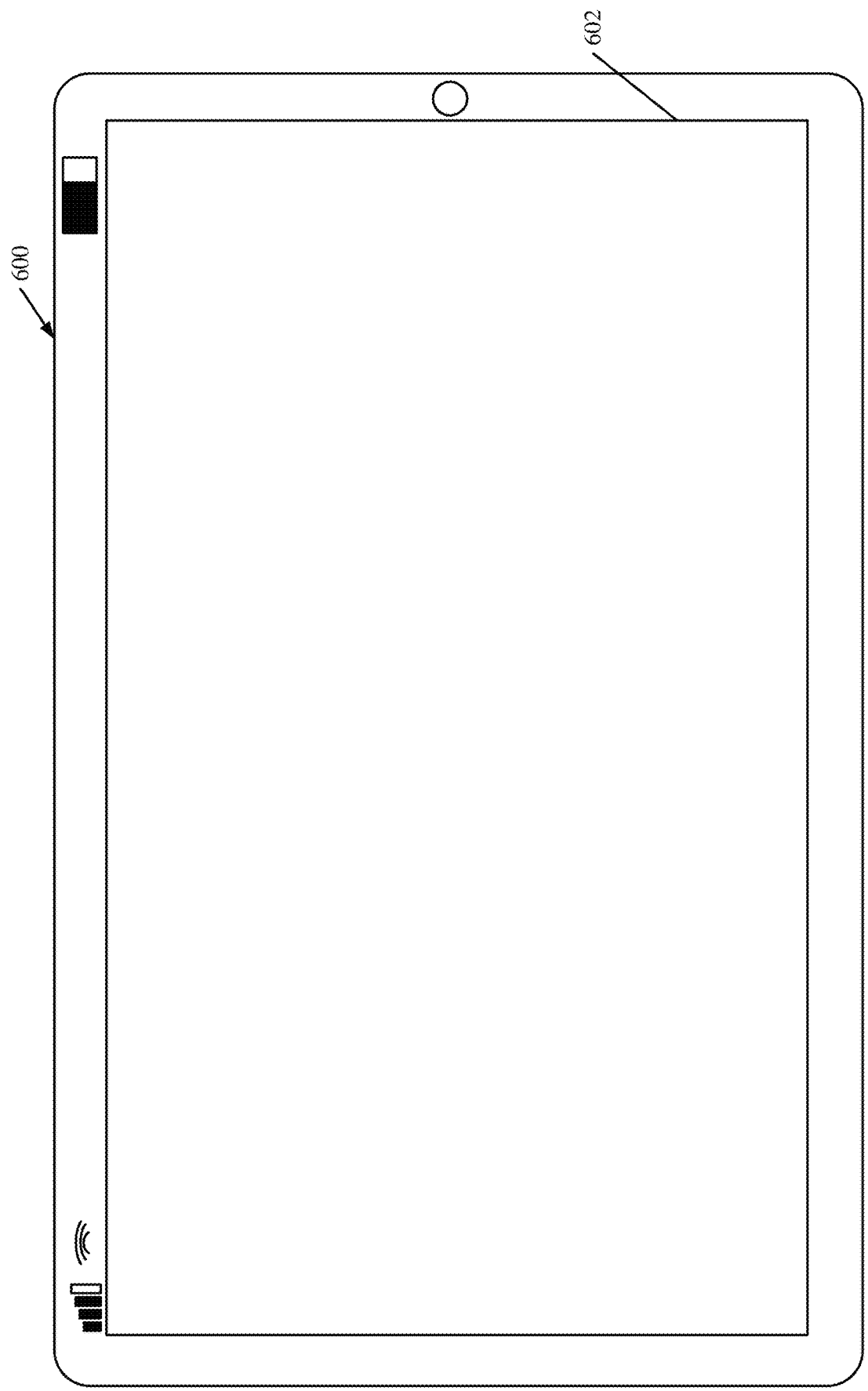
Figure 11:
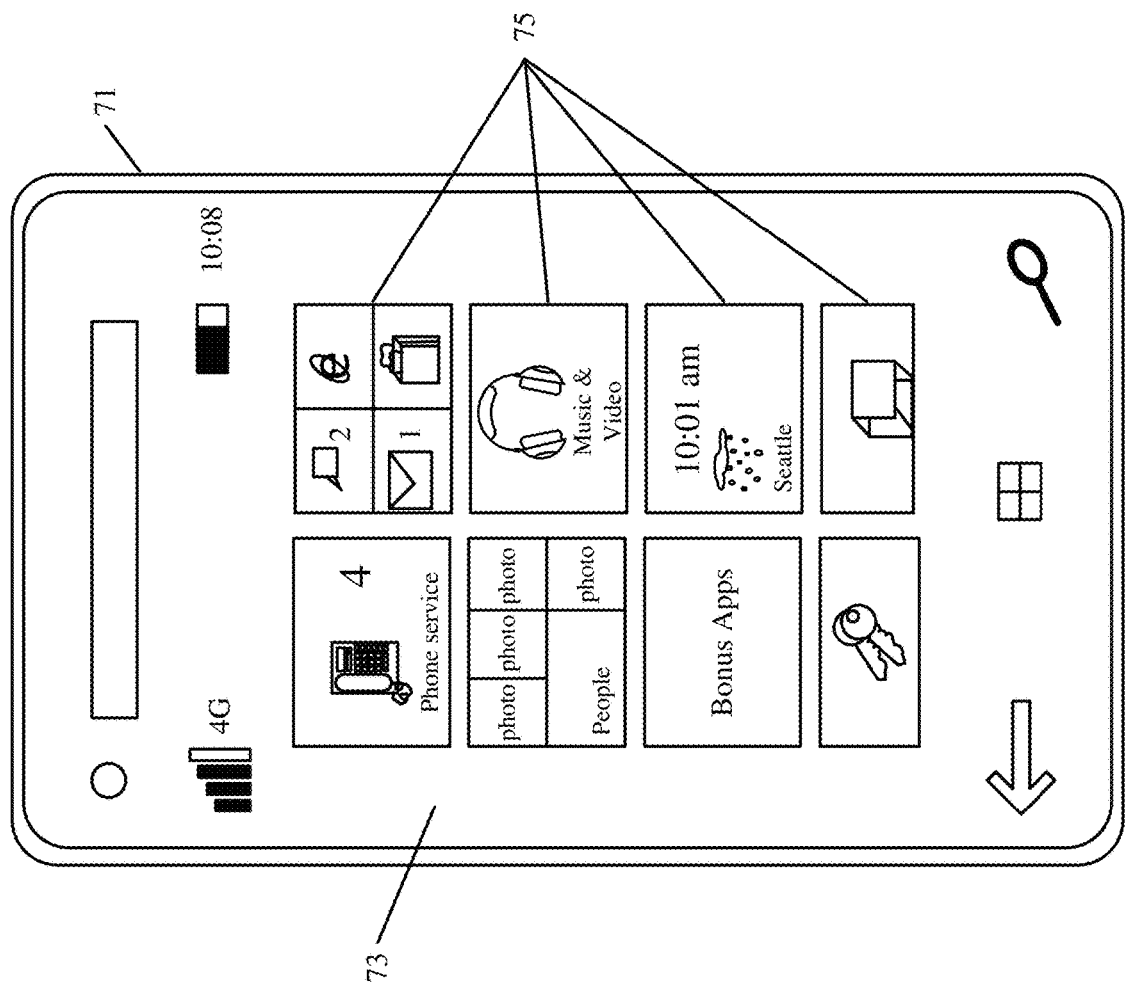

FIG. 9 is a simplified block diagram of one illustrative example of a handheld or mobile computing device that can be used as a user's or client's handheld device 16, in which the present system (or parts of it) can be deployed. For instance, a mobile device can be deployed in the operator compartment of harvester 100 for use in providing or implementing functionality discussed herein. FIGS. 10-11 are examples of handheld or mobile devices.

FIG. 9 provides a general block diagram of the components of a client device 16 that can run some components shown in previous figures, that interacts with them, or both. In the device 16, a communications link 13 is provided that allows the handheld device to communicate with other computing devices and under some examples provides a channel for receiving information automatically, such as by scanning. Examples of communications link 13 include allowing communication though one or more communication protocols, such as wireless services used to provide cellular access to a network, as well as protocols that provide local wireless connections to networks.

In other examples, applications can be received on a removable Secure Digital (SD) card that is connected to an interface 15. Interface 15 and communication links 13 communicate with a processor 17 (which can also embody processors or servers from other figures described herein) along a bus 19 that is also connected to memory 21 and input/output (I/O) components 23, as well as clock 25 and location system 27.

I/O components 23, in one example, are provided to facilitate input and output operations. I/O components 23 for various examples of the device 16 can include input components such as buttons, touch sensors, optical sensors, microphones, touch screens, proximity sensors, accelerometers, orientation sensors and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a dead reckoning system, a cellular triangulation system, or other positioning system. Location system 27 can also include, for example, mapping software or navigation software that generates desired maps, navigation routes and other geographic functions.

Memory 21 stores operating system 29, network settings 31, applications 33, application configuration settings 35, contact or phone book application 43, client system 24, data store 37, communication drivers 39, and communication configuration settings 41. Memory 21 can include all types of tangible volatile and non-volatile computer-readable memory devices. Memory 21 may also include computer storage media (described below). Memory 21 stores computer readable instructions that, when executed by processor 17, cause the processor to perform computer-implemented steps or functions according to the instructions. Processor 17 may be activated by other components to facilitate their functionality as well.

FIG. 10 shows one example in which device 16 is a tablet computer 600. In FIG. 10, computer 600 is shown with user interface display screen 602. Screen 602 can be a touch screen or a pen-enabled interface that receives inputs from a pen or stylus. Tablet computer 600 may also use an on-screen virtual keyboard. Of course, computer 600 might also be attached to a keyboard or other user input device through a suitable attachment mechanism, such as a wireless link or USB port, for instance. Computer 600 may also illustratively receive voice inputs as well.

FIG. 11 is similar to FIG. 10 except that the device is a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 12:
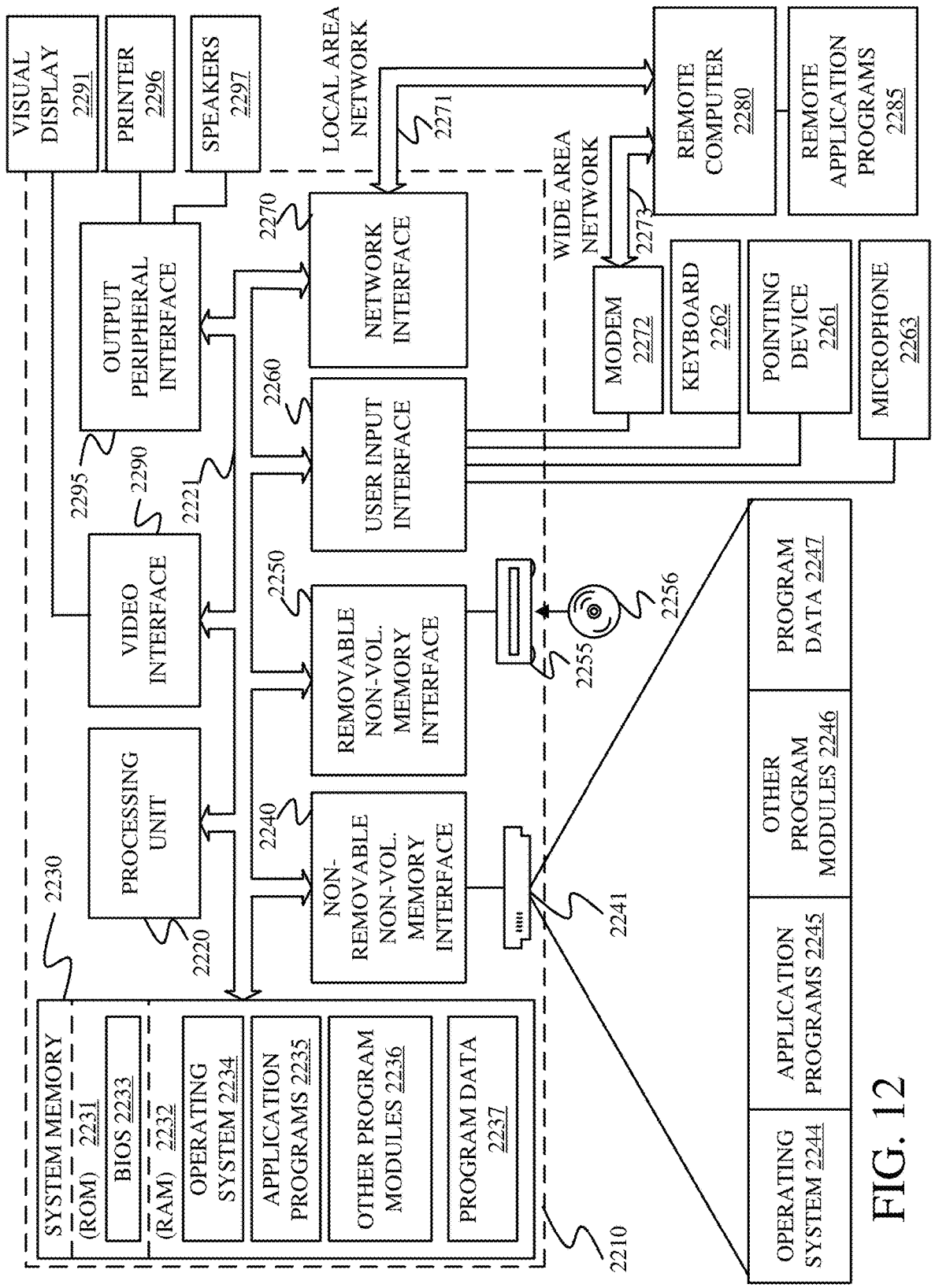
FIG. 12 is a block diagram of one example of a computing environment that can be used in systems and environments in other FIGS.

FIG. 12 is one example of a computing environment in which elements of previous figures described herein can be deployed. With reference to FIG. 12, an example system for implementing some embodiments includes a computing device in the form of a computer 2210 programmed to operate as discussed above. Components of computer 2210 may include, but are not limited to, a processing unit 2220 (which can comprise processors or servers from previous figures described herein), a system memory 2230, and a system bus 2221 that couples various system components including the system memory to the processing unit 2220. The system bus 2221 may be any of several types of bus structures including a memory bus or memory controller, a peripheral bus, and a local bus using any of a variety of bus architectures. Memory and programs described with respect to previous figures described herein can be deployed in corresponding portions of FIG. 12.

Computer 2210 typically includes a variety of computer readable media. Computer readable media may be any available media that can be accessed by computer 2210 and includes both volatile and nonvolatile media, removable and non-removable media. By way of example, and not limitation, computer readable media may comprise computer storage media and communication media. Computer storage media is different from, and does not include, a modulated data signal or carrier wave. Computer readable media includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 2210. Communication media may embody computer readable instructions, data structures, program modules or other data in a transport mechanism and includes any information delivery media. The term "modulated data signal" means a signal that has one or more of its characteristics set or changed in such a manner as to encode information in the signal.

The system memory 2230 includes computer storage media in the form of volatile and/or nonvolatile memory or both such as read only memory (ROM) 2231 and random access memory (RAM) 2232. A basic input/output system 2233 (BIOS), containing the basic routines that help to transfer information between elements within computer 2210, such as during start-up, is typically stored in ROM 2231. RAM 2232 typically contains data or program modules or both that are immediately accessible to and/or presently being operated on by processing unit 2220. By way of example, and not limitation, FIG. 12 illustrates operating system 2234, application programs 2235, other program modules 2236, and program data 2237.

The computer 2210 may also include other removable/non-removable volatile/nonvolatile computer storage media. By way of example only, FIG. 12 illustrates a hard disk drive 2241 that reads from or writes to non-removable, nonvolatile magnetic media, an optical disk drive 2255, and non-volatile optical disk 2256. The hard disk drive 2241 is typically connected to the system bus 2221 through a non-removable memory interface such as interface 2240, and optical disk drive 2255 are typically connected to the system bus 2221 by a removable memory interface, such as interface 2250.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (e.g., ASICs), Application-specific Standard Products (e.g., ASSPs), System-on-a-chip systems (SOCs), Complex Programmable Logic Devices (CPLDs), etc.

The drives and their associated computer storage media discussed above and illustrated in FIG. 12, provide storage of computer readable instructions, data structures, program modules and other data for the computer 2210. In FIG. 12, for example, hard disk drive 1241 is illustrated as storing operating system 2244, application programs 2245, other program modules 2246, and program data 2247. Note that these components can either be the same as or different from operating system 2234, application programs 2235, other program modules 2236, and program data 2237.

A user may enter commands and information into the computer 2210 through input devices such as a keyboard 2262, a microphone 2263, and a pointing device 2261, such as a mouse, trackball or touch pad. Other input devices (not shown) may include a joystick, game pad, satellite dish, scanner, or the like. These and other input devices are often connected to the processing unit 2220 through a user input interface 2260 that is coupled to the system bus, but may be connected by other interface and bus structures. A visual display 2291 or other type of display device is also connected to the system bus 2221 via an interface, such as a video interface 2290. In addition to the monitor, computers may also include other peripheral output devices such as speakers 2297 and printer 2296, which may be connected through an output peripheral interface 2295.

The computer 2210 is operated in a networked environment using logical connections (such as a controller area network—CAN, local area network—LAN, or wide area network WAN) to one or more remote computers, such as a remote computer 2280.

When used in a LAN networking environment, the computer 2210 is connected to the LAN 2271 through a network interface or adapter 2270. When used in a WAN networking environment, the computer 2210 typically includes a modem 2272 or other means for establishing communications over the WAN 2273, such as the Internet. In a networked environment, program modules may be stored in a remote memory storage device. FIG. 12 illustrates, for example, that remote application programs 2285 can reside on remote computer 2280.

It should also be noted that the different examples described herein can be combined in different ways. That is, parts of one or more examples can be combined with parts of one or more other examples. All of this is contemplated herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of the claims.

What is claimed is:

1. A computer implemented method, comprising:
   detecting material other than grain (MOG) engaged by an agricultural harvester;
   generating a detection signal indicative of the detected MOG;
   identifying a content characteristic of the MOG based on the detection signal; and
   generating a control signal to control a controllable subsystem on the agricultural harvester based on the content characteristic of the MOG.

2. The computer implemented method of claim 1 identifying a content characteristic of the MOG comprises:
   identifying a color of the MOG.

3. The computer implemented method of claim 1 wherein the MOG includes leaf material and stalk material and wherein identifying a content characteristic comprises:
   identifying a leaf-to-stalk ratio in the MOG based on the detection signal.

4. The computer implemented method of claim 1 wherein detecting MOG comprises:
   capturing an image of the MOG.

5. The computer implemented method of claim 4 wherein generating a detection signal comprises:
   generating an image signal indicative of the image of the MOG.

6. The computer implemented method of claim 5 wherein identifying the content characteristic comprises:
   processing the image of the MOG to identify the content characteristic of the MOG.

7. The computer implemented method of claim 4 wherein capturing an image of the MOG comprises:
   capturing an image of residue after the residue exits the agricultural harvester.

8. The computer implemented method of claim 4 wherein capturing an image of the MOG comprises:
   capturing an image of material being processed in the agricultural harvester.

9. The computer implemented method of claim 4 wherein capturing an image of the MOG comprises:
   capturing an image of crop prior to being engaged by the agricultural harvester.

10. The computer implemented method of claim 1 wherein the agricultural harvester includes a crop processing component, and wherein detecting MOG comprises:
    detecting a torque applied to the crop processing component.

11. The computer implemented method of claim 1 wherein the agricultural harvester includes a set of deck plates and a deck plate actuator that controls a spacing corresponding to the deck plates and wherein generating a control signal comprises:
    generating a control signal to control the deck plate actuator to control the spacing corresponding to the deck plates based on the content characteristic of the MOG.

12. The computer implemented method of claim 1 wherein the agricultural harvester includes a header component actuator that drives a header component and wherein generating a control signal comprises:
    generating a control signal to control the header component actuator to control the speed of the header component based on the content characteristic of the MOG.

13. The computer implemented method of claim 1 wherein the agricultural harvester includes a display device and wherein generating a control signal comprises:
   generating a display control signal to control the display device to display an indication of the content characteristic of the MOG.

14. An agricultural system, comprising:
   a sensor configured to detect material other than grain (MOG) engaged by an agricultural harvester and generate a detection signal indicative of the detected MOG;
   a content characteristic processing system configured to identify a content characteristic of the MOG based on the detection signal;
   a controllable subsystem; and
   a control signal generator configured to generate a control signal to control the controllable subsystem on the agricultural harvester based on the content characteristic of the MOG.

15. The agricultural system of claim 14 wherein the content characteristic processing system comprises:
   a MOG color identification system configured to identify a color of the MOG.

16. The agricultural system of claim 14 wherein the MOG includes leaf material and stalk material and wherein the content characteristic processing system comprises:
   a leaf-to-stalk ratio identification system configured to identify a leaf-to-stalk ratio in the MOG based on the detection signal.

17. The agricultural system of claim 14 wherein the sensor comprises:
   an optical sensor configured to capture an image of the MOG and generate an image signal indicative of the image of the MOG.

18. The agricultural system of claim 17 wherein the content characteristic processing system comprises:
   an image processing system configured to process the image of the MOG to identify the content characteristic of the MOG.

19. The agricultural system of claim 14 wherein the agricultural harvester includes a crop processing component and wherein the sensor comprises:
   a torque sensor configured to detect a torque applied to the crop processing component to process the crop.

20. An agricultural harvester, comprising:
   a sensor configured to detect material other than grain (MOG) engaged by the agricultural harvester and generate a detection signal indicative of the detected MOG;
   a content characteristic processing system configured to identify a content characteristic of the MOG based on the detection signal;
   a controllable subsystem; and
   a control signal generator configured to generate a control signal to control the controllable subsystem on the agricultural harvester based on the content characteristic of the MOG.

* * * * *